United States Patent [19]

Hirai et al.

[11] Patent Number: 5,465,344
[45] Date of Patent: Nov. 7, 1995

[54] MICROPROCESSOR WITH DUAL-PORT CACHE MEMORY FOR REDUCING PENALTY OF CONSECUTIVE MEMORY ADDRESS ACCESSES

[75] Inventors: Koutarou Hirai, Kobe; Seiji Yamaguchi, Hirakata, both of Japan

[73] Assignee: Matsushita Electric Industrial Co., Ltd., Osaka, Japan

[21] Appl. No.: 352,445

[22] Filed: Dec. 9, 1994

Related U.S. Application Data

[63] Continuation of Ser. No. 746,944, Aug. 19, 1991, abandoned.

[30] Foreign Application Priority Data

Aug. 20, 1990 [JP] Japan ..................... 2-219247

[51] Int. Cl.[6] ............................ G06F 13/00; G06F 13/14
[52] U.S. Cl. .......................... 395/458; 395/460; 395/473
[58] Field of Search ................................... 395/400, 425, 395/49

[56] References Cited

U.S. PATENT DOCUMENTS

| | | | |
|---|---|---|---|
| 3,732,440 | 5/1973 | Platt et al. | 365/227 |
| 4,400,774 | 8/1983 | Toy | 364/200 |
| 4,488,063 | 12/1984 | Lee | 307/289 |
| 4,860,263 | 8/1989 | Mattausch | 365/230.05 |
| 5,001,671 | 3/1991 | Koo et al. | 365/230.05 |
| 5,056,002 | 10/1991 | Watanabe | 364/200 |
| 5,124,802 | 6/1992 | Ito et al. | 358/298 |
| 5,133,074 | 7/1992 | Chou | 395/725 |
| 5,222,223 | 6/1993 | Webb, Jr. et al. | 395/425 |
| 5,228,135 | 7/1993 | Ikumi | 395/425 |
| 5,247,649 | 9/1993 | Bandoh | 395/425 |
| 5,274,790 | 12/1993 | Suzuki | 395/425 |

OTHER PUBLICATIONS

"Firefly: A Multiprocessor Workstation", Charles P. Thacker et al., IEEE Transactions on Computers, vol. 27, No. 8, Aug. 1988, pp. 909–920.

*Primary Examiner*—Michael A. Whitfield
*Attorney, Agent, or Firm*—Wenderoth, Lind & Ponack

[57] ABSTRACT

A microprocessor has a CPU, an address converter which converts a logical address to a physical address, first and second latches which are controlled by a control signal and store the physical addresses, and a dual port cache memory device. The dual port cache memory device has decoders which operate according to second parts of outputs of the latches, dual port memory arrays which can be independently accessed by outputs of the decoders, a comparator which compares a physical address output from the dual port memory array and a first part of an output of the first latch to determine if they are the same, and a second comparator which compares a physical address output from the dual port memory array and a first part of an output of the second latch to determine if they are the same. The microprocessor is configured to effectively utilize the two ports of the dual port memory array of the dual port cache memory device, significantly improving the operating speed of the overall system by reducing the occurrence of penalties when consecutive instructions operating the cache memory are executed.

12 Claims, 15 Drawing Sheets

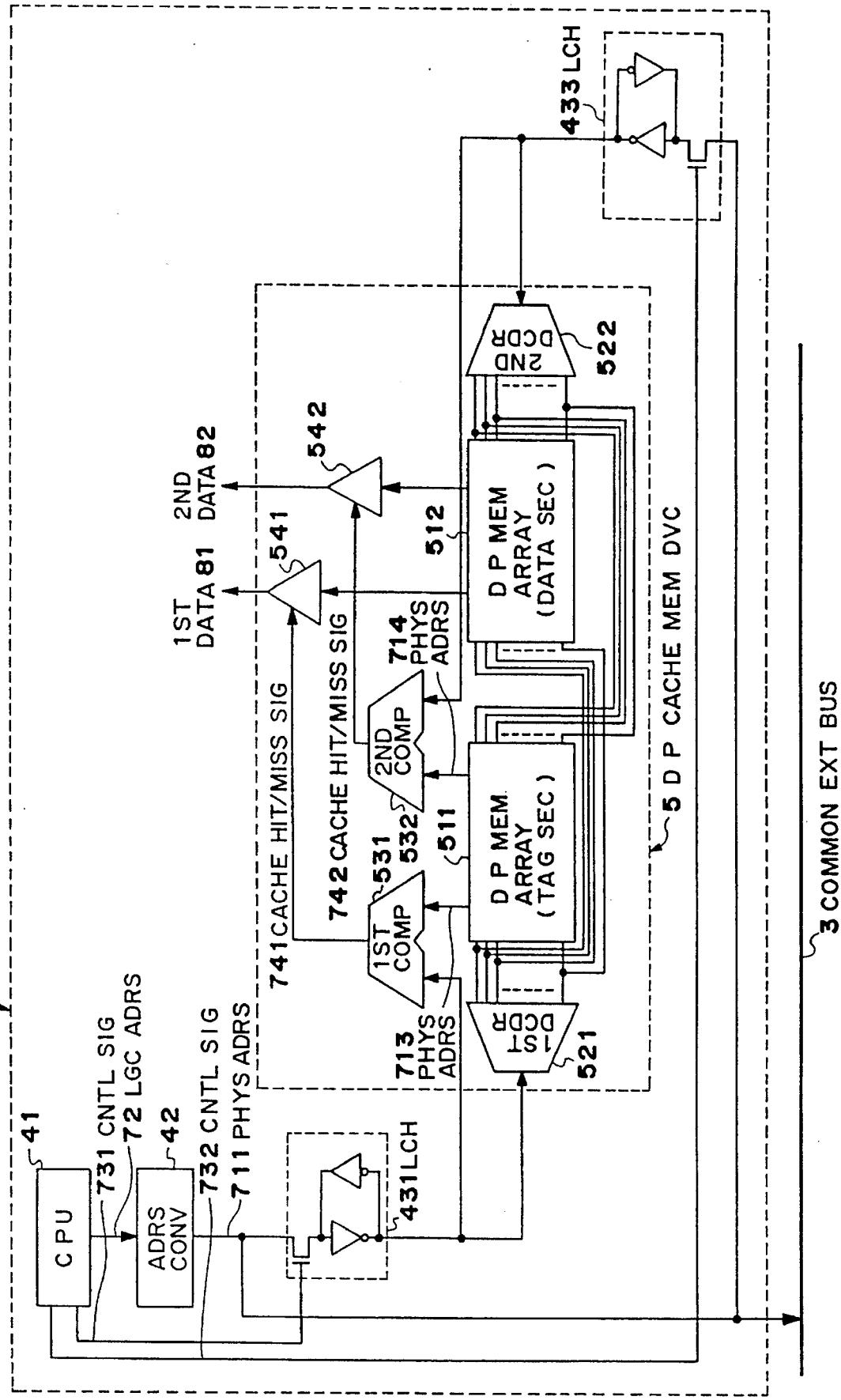

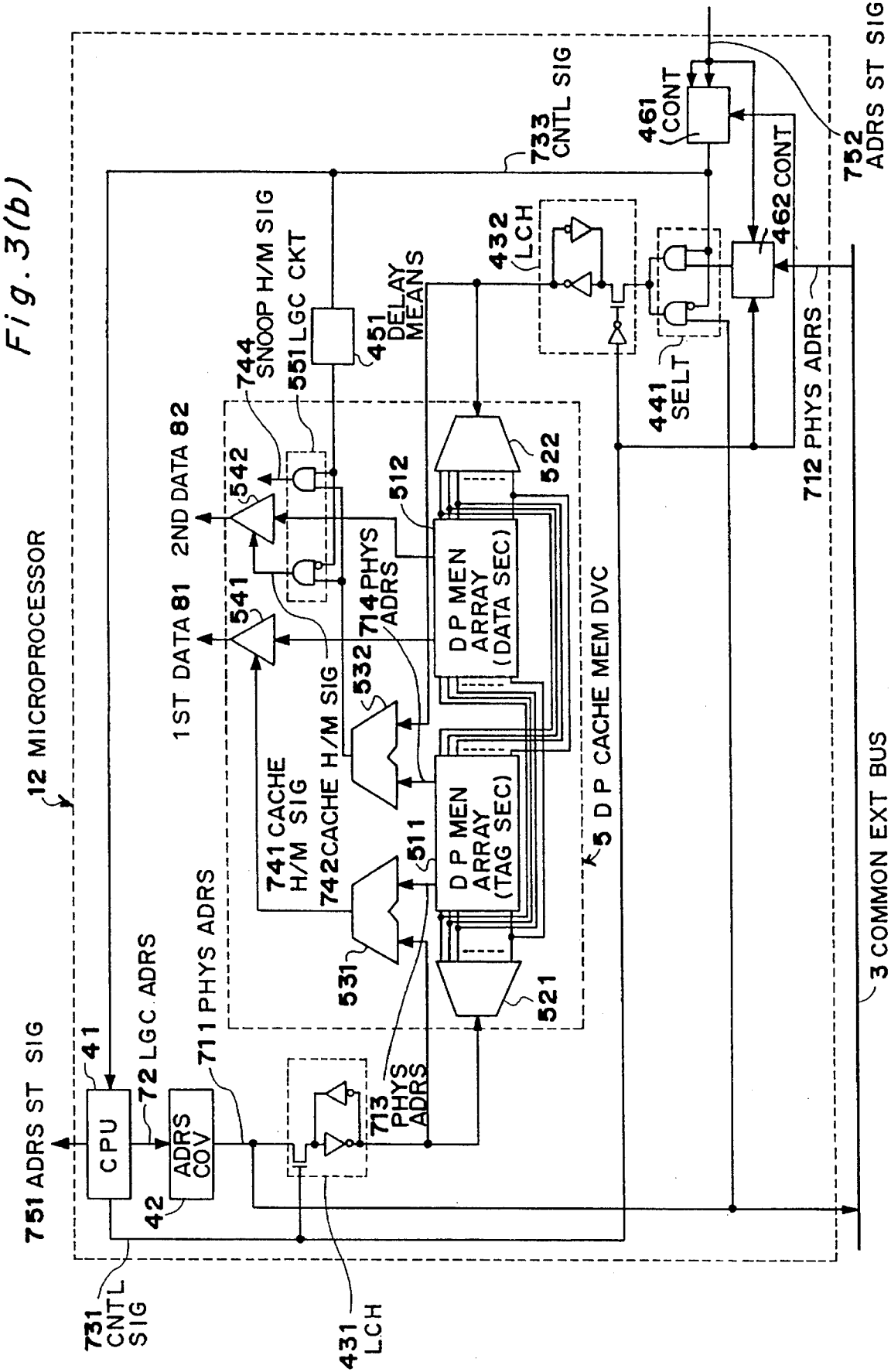

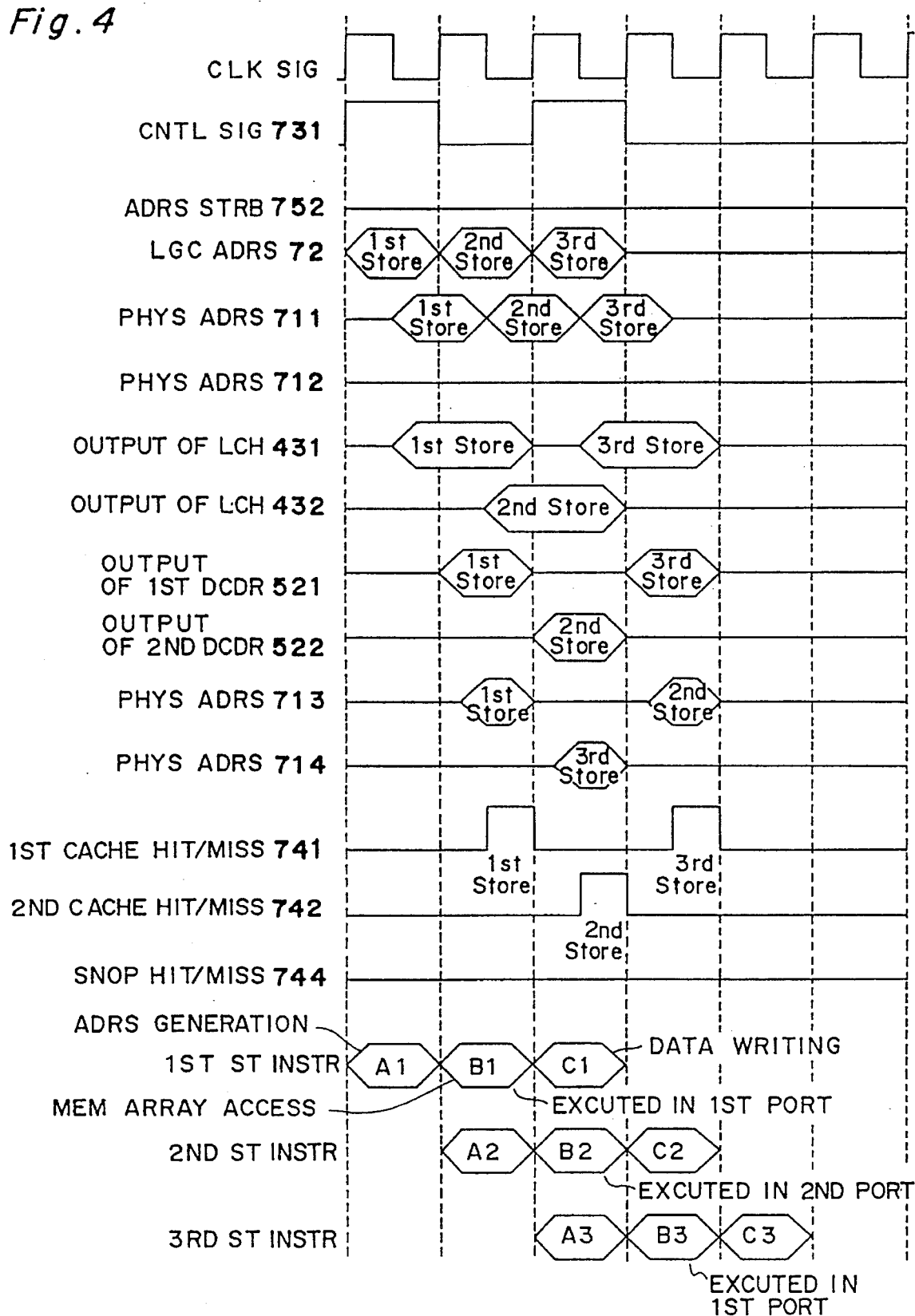

MICROPROCESSOR WITH DUAL-PORT CACHE MEMORY FOR REDUCING PENALTY OF CONSECUTIVE MEMORY ADDRESS ACCESSES

This application is a continuation of now abandoned application, Ser. No. 07/746,944, filed Aug. 19, 1991 now abandoned.

BACKGROUND OF THE INVENTION

The present invention relates to a microprocessor having a reduced instruction set computer (hereinbelow referred to as RISC) architecture, and more particularly to a microprocessor capable of decreasing penalty occurrences when instructions which operate a built-in cache memory are consecutive.

Cache memories built into microprocessors, having a RISC architecture designed to execute one instruction per cycle, are generally used to improve the performance of multiprocessor designs and pipeline constructions providing parallel instruction processing and to achieve microprocessors having a higher effective performance.

The construction of a conventional RISC type microprocessor including a cache memory is shown in FIG. 10. (See MC68020 User's Manual, Chapter 7, On-chip cache memory, pp. 89–91; published by CQ Shuppan.) As shown in FIG. 10, the microprocessor 101 comprises a CPU 41, an address converter 42 to convert the logical address 72 generated by the CPU 41 to a physical address 711 and a single port cache memory device 6. The cache memory device 6 includes a decoder 62 to decode the address using the second part of the physical address 711, memory arrays 611, 612 accessed according to the output of the decoder 62, a comparator 63 to compare the first part of the physical address 711 and the physical address 713 read from the memory array 611 to determine if they are the same, and a tri-state buffer 64 to output data read from the memory array 612 only when a cache hit signal 741 is output from the comparator 63, that is, the comparator 63 judges that the first part of the physical address 711 coincides with the physical address 713 read form the memory array 611.

The basic operation of the microprocessor 101 having this built-in single port cache memory device 6 is described hereinbelow with reference to FIG. 11. The logical address 72 is generated by the CPU 41 when a memory operation instruction is executed. This logical address 72 is converted by the address converter 42 to the physical address 711 used in address decoding. The second part of the converted physical address 711 is used to select the set address of the memory arrays 611, 612 via the decoder 62, and the physical address 713 stored in the single port memory array 611 and data stored in the single port memory array 612 is read simultaneously. The first part of the physical address 711 is then compared by the comparator 63 with the physical address 713 read from the memory array 611; if the addresses match, a cache hit signal 741 is output, and if they do not match, a cache miss signal 741 is output. When the cache hit signal 741 is output, the tri-state buffer 64 is opened by the cache hit signal 741, and a data read from an external device memory array 612 is output to the form single port cache memory device 6. When the cache miss signal 741 is output, the tri-state buffer 64 enters into a high-impedance state and prevents the data from the memory array 612 from being output from the single port cache memory device 6.

Furthermore, it is also common to provide a cache memory adapted to a multiprocessor architecture having a bus snoop function to prevent the reading of false data from the cache memory when data which differs from the data in the common external memory is present in the cache memory of the microprocessor. A dual port memory array is commonly used in the on-chip cache memory for this purpose with the ports of the memory array divided between the CPU and the common bus so that the memory array can be accessed by either port.

In a conventional microprocessor including a cache memory device as thus described, however, when there are successive instructions operating the cache memory it becomes difficult to execute one instruction per cycle and a penalty occurs, thus decreasing the performance of the overall system. This is a major drawback to a RISC type microprocessor which is limited to executing one instruction per cycle.

For example, when plural store instructions are successively generated in this conventional microprocessor, it is necessary for the CPU 41 to continue outputting the logical address 72 between the cycle in which the physical address 711 is converted and the cycle in which the memory arrays 611 and 612 are accessed. In other words, the logical address 72 generated by the CPU 41 cannot be output for the next store instruction until the memory arrays 611, 612 access is completed as shown in FIG. 11, and a penalty occurs. Therefore, the longer the succession of store instructions, the longer the duration of the penalty becomes, thereby decreasing the operating speed of the overall system.

SUMMARY OF THE INVENTION

Therefore, the object of the present invention is to provide a microprocessor having a built-in cache memory device which resolves this problem and reduces the decrease in the operating speed of the overall system by using a dual port memory array and effectively accessing each port thereof to reduce the length of the penalty period.

In order to accomplish the above object, a microprocessor of the present invention includes an address generation device which generates a physical address, first and second storage devices which store outputs of the address generation device, and a dual port memory which can be independently accessed in accordance with second parts of the outputs of the first and second storage devices. The microprocessor further includes a first comparator which detects a match between a first part of an output from the first storage device and an output of the dual port memory accessed in accordance with a second part of the output of the first storage device, a second comparator which detects a match between a first part of an output from the second storage device and an output of the dual port memory accessed by a second part of the output of the second storage device, and a control device which outputs a control signal which causes enabling portions of the first and second storage device to alternately become ON.

The physical address generated by the address generation device is a data address.

Alternately, the physical address generated by the address generation device is an instruction address.

A microprocessor of another embodiment of the present invention includes first and second address generation device which generate physical addresses, an address selector which selects an output of either the first or second address generation devices, a first storage device which stores the output of the first address generation device, a second storage device which stores an output of the address selector, and a dual port memory which can be independently accessed in accordance with second parts of the outputs of the first and second storage means devices. The microprocessor further includes a first comparator which detects a match between a first part of an output from the first storage device and an output of the dual port memory accessed by the second part of the output of the first storage device, a second comparator which detects a match between a first part of an output from the second storage device and an output of the dual port memory accessed by the second part of the output of the second storage device, and a control device which outputs a control signal for causing enabling portions of the first and second storage devices to alternately become ON, and receives an address strobe signal, and causes the address selector to select the output of the first address generation device when the address strobe signal is in a first state, or causes the address selector to select the output of the second address generation device when the address strobe signal is in a second state.

It is preferable that said control device includes a first control part which outputs a control signal for causing the enabling portions of the first and second storage device to alternately become ON, and a second control part which receives the address strobe signal and causes the address selector to select the output of the first address generation device when the address strobe signal is in the first state, or causes the address selector to select the output of the second generation device when the address strobe signal is in the second state.

Further, it is preferable that the second control part of the control device is constructed to be supplied with the control signal output by the first control part and includes a delay device which delays and outputs the output of the second address generation device to the address selector when the second control part receives the control signal to enable the first storage device to store and the address strobe signal is in the second state.

Furthermore, the physical address generated by the first address generation device is a data address, and the physical address generated by the second address generation device is a bus address supplied via an external bus.

Alternately, the physical address generated by the first address generation device is a data address, and the physical address generated by the second address generation device is an instruction address.

A microprocessor of yet another embodiment of the present invention includes first and second address generation devices which generate physical addresses, first and second address selectors which select an output of the first address generation device when an address strobe signal is in a first state, and select an output of the second address generation device when the address strobe signal is in a second state, first and second storage devices which store outputs of the first and second address selectors, and a dual port memory which can be independently accessed in accordance with second parts of the outputs of the first and second storage devices. The microprocessor further includes a first comparator which detects a match between a first part of an output from the first storage device and an output of the dual port memory accessed by a second part of the output of the first storage device, a second comparator which detects a match between a first part of an output from the second storage device and an output of the dual port memory accessed by a second part of the output of the second storage device, and a control device which outputs a control signal which causes enabling portions of the first and second storage devices to alternately become ON.

The physical address generated by the first address generation device is a data address, and the physical address generated by the second address generation device is a bus address supplied via an external bus.

Alternately the physical address generated by the first address generation device is a data address, and the physical address generated by the second address generation device is an instruction address.

As another alternative the physical address generated by the first address generation device is a data address, and the physical address generated by the second address generation device is a branch address.

A microprocessor as above-described is able to effectively utilize the two ports of the dual port memory array of the dual port cache memory device, thereby significantly improving the operating speed of the overall system by reducing the occurrence of penalties even when consecutive instructions operating the cache memory are executed.

BRIEF DESCRIPTION OF THE DRAWINGS

The present invention will become more fully understood from the detailed description given below and the accompanying diagrams wherein:

FIG. 1(b) is a block diagram of a variation of the above microprocessor;

FIG. 3(b) is a block diagram of the microprocessor of the second embodiment of the present invention;

FIG. 4 is a sequence chart describing the operation of the second embodiment when plural store instructions are consecutively executed when a physical address is not supplied from a common bus;

DESCRIPTION OF PREFERRED EMBODIMENTS

First Embodiment

Figure 1A:
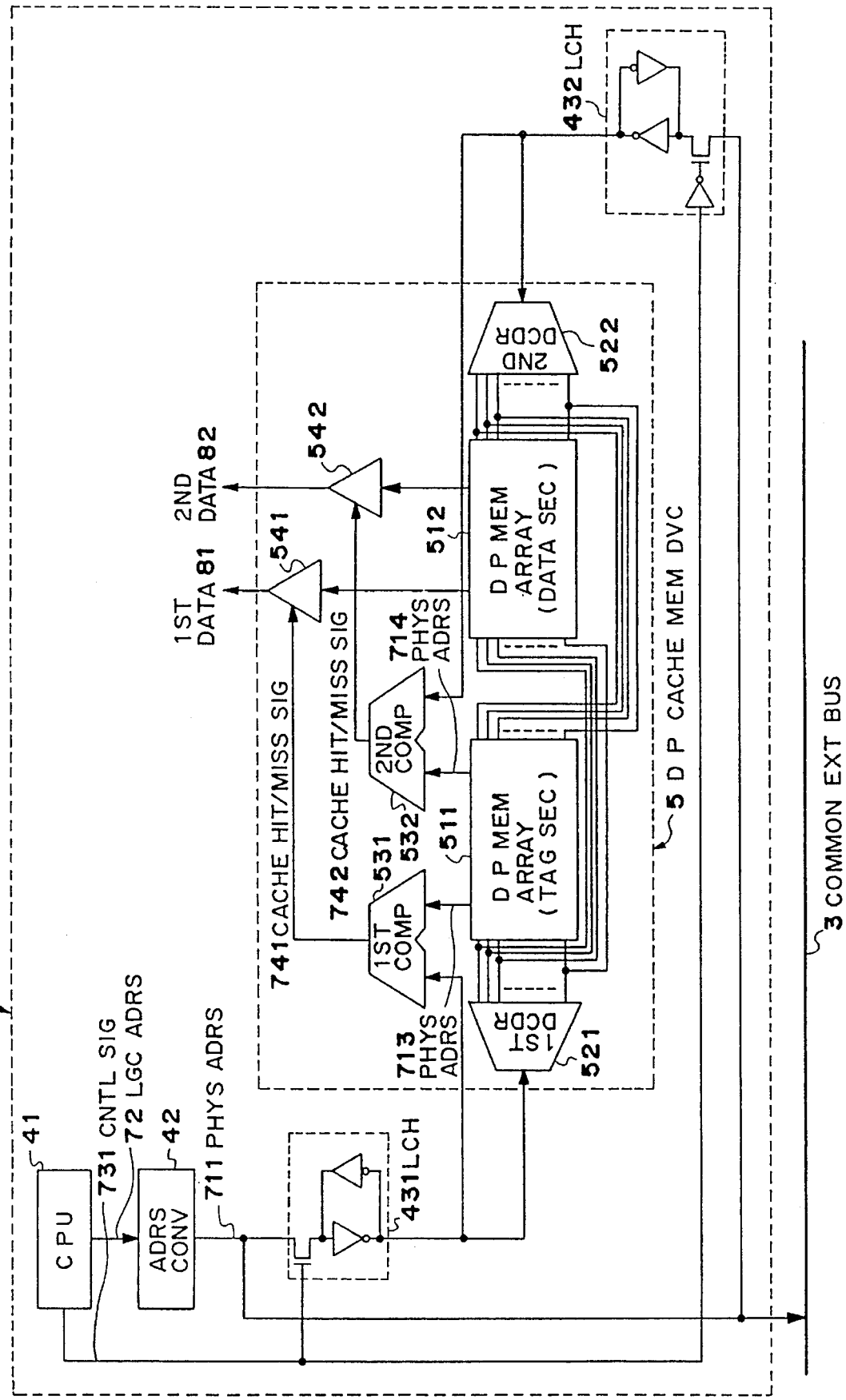
FIG. 1(a) is a block diagram of a microprocessor according to a first embodiment of the present invention.

The first embodiment of the present invention is described hereinbelow with reference to FIG. 1(*a*), showing a block diagram of a microprocessor having a single processor architecture.

As shown in FIG. 1(*a*), the microprocessor 111 comprises a CPU (central processing unit) 41, and an address converter 42 to convert a logical address 72 generated by the CPU 41 to a physical address 711. A control signal 731, the state of which changes synchronized to a clock signal while an instruction operating the memory is generated, is output from the CPU 41. Further, the microprocessor 111 comprises a latch 431 which stores the physical address 711 when the control signal 731 is in a HIGH state, a latch 432 which stores the physical address 711 when the control signal 731 is in a LOW state, and a dual port cache memory device 5. The dual port cache memory device 5 comprises a first decoder 521 which functions using the second part of the physical address 711 output by the latch 431, a second decoder 522 which functions using the second part of the physical address 711 output by -the other latch 432, and dual port memory arrays 511, 512 which can be accessed independently by either a first port connected to the first decoder 521 or a second port connected to the second decoder 522. The dual port memory arrays 511, 512 respectively memorize the first part of the physical address 711 as a data, the address of which is the data corresponding to the second part of the physical address 711. The dual port cache memory 5 further includes, a first comparator 531 which compares the first part of the physical address 711 output by the latch 431 with the physical address 713 read from the dual port memory array 511 to determine if they are the same address. Lastly, the dual port cache memory device 5 further includes, a second comparator 532 which compares the first part of the physical address 711 output by the latch 432 with the physical address 714 read from the dual port memory array 511 to determine if they are the same address, a first tri-state buffer 541 to cause a first data read from the dual port memory array 512 to pass therethrough only when the first comparator 531 outputs a cache hit signal which represents that the first part of the physical address 711 from the latch 431 and the physical address 713 from the dual port memory array 511 are the same address, that is, a first port side is of a hit, and a second tri-state buffer 542 to cause a second data read from the dual port memory array 512 to pass therethrough only when the second comparator 532 outputs a cache hit signal which represents that the first part of the physical address 711 from the latch 432 and the physical address 714 from-the dual port memory array 511 are the same address, that is, a second port side is of a hit.

The control signal 731 of CPU 41 can be generated in this device by adding a circuit to the instruction pipeline, which is a function of the normal CPU. The instruction pipeline fetches an instruction with the CPU and decodes the instruction code to determine what the instruction is. The instruction is executed by performing the operations of the operand with the result stored in a register. Therefore, a typical means generating the control signal 731 uses the result of the decoded instruction to determine whether the instruction is a memory operation instruction, and if it is, outputs a pulse from a pulse generator and generates the control signal 731 changing the state every cycle synchronized to the clock signal by a D flip-flop though these are not shown in figures. In addition, for example, a translation look-aside buffer (TLB) or address conversion table may be used as the address convertor 42.

The microprocessor 111 having the above function blocks is connected to a common external bus 3 through a bus for the physical address 711 to share data with other devices. Furthermore, the first decoder 521 and the second decoder 522 both output the same output for any same input.

The operation of the first embodiment is described hereinbelow with reference to FIG. 1(*a*) and FIG. 2. That case in which the successive memory operation instruction is three consecutive store instructions is described by way of example. It is furthermore assumed that the initial state of the control signal 731 is LOW.

When the first store instruction is executed, the logical address 72 is output from the CPU 41 and converted to a physical address 711 by the address converter 42. When the CPU 41 recognizes that a memory operation instruction has been executed, it changes the control signal 731 from a LOW to a HIGH state, and sets the enabling portion of the latch 431 to an ON state and the enabling portion of the other latch 432 to an OFF state, thus enabling the physical address 711, which is the output from the address converter 42, to be stored by the first latch 431. The operation to this point requires one clock cycle, which is the address generation cycle for the first store instruction.

In the next cycle, the set address is selected from the first port using the second part of the latch 431 output to access the dual port memory array 511 according to the first store instruction, and the physical address 713, which is stored in the dual port memory array 511 at the indicated set address, is output. This physical address 713 and the first part of the latch 431 output are then compared by the first comparator 531 to determine if they are the same; if they are, a cache hit signal 741 is output, and if they are not, a cache miss signal 741 is output. The CPU 41 simultaneously executes the second store instruction and outputs the current logical address 72. In addition, the control signal 731 changes from a HIGH to a LOW state, the enabling portion of the latch 431 becomes OFF and the enabling portion of the other latch 432 becomes ON, thus storing the physical address 711, which is the output of the address converter 42, to the enabled latch 432. Thus, this second cycle is the cycle in which the dual port memory array is accessed according to the first store instruction and the cycle in which the address is generated for the second store instruction, both operations being completed with no interference therebetween and no penalty occurring.

In the next cycle, the set address is selected from the second port using the second part of the latch 432 output to access the dual port memory array 511 according to the second store instruction, and the physical address 714, which is stored in the dual port memory array 511 at the indicated set address, is output. This physical address 714 and the first part of the latch 432 output are then compared by the second comparator 532 to determine if they are the same; if they are, a cache hit signal 742 is output, and if they are not, a cache miss signal 742 is output. The CPU 41 simultaneously executes the third store instruction and outputs the current logical address 72. In addition, the control signal 731 changes from a LOW to a HIGH state, the enabling portion of the latch 431 becomes ON and the enabling portion of the other latch 432 becomes OFF, thus storing the physical address 711, which is the output of the address converter 42, to the enabled latch 431. Thus, this third cycle is the cycle in which the dual port memory array 511 is accessed according to the second store instruction and the cycle in which the address is generated for the third store instruction, both operations being completed with no interference therebetween and no penalty occurring.

In the last cycle, the set address is selected from the first port using the second part of the latch 431 output to access the dual port memory array 511 according to the third store instruction, and the physical address 713, which is stored in the dual port memory array 511 at the indicated set address, is output. This physical address 713 and the first part of the latch 431 output are then compared by the first comparator 531 to determine if they are the same; if they are, a cache hit signal 741 is output, and if they are not, a cache miss signal 741 is output. Thus, this cycle is that in which the dual port memory array 511 is accessed according to the third store instruction.

As thus described hereinabove, the microprocessor according to the first embodiment of the invention can output cache hit/miss signals 741 and 742 at each cycle without any penalty when memory operation instructions are consecutively output in a single processor architecture.

Figure 2:
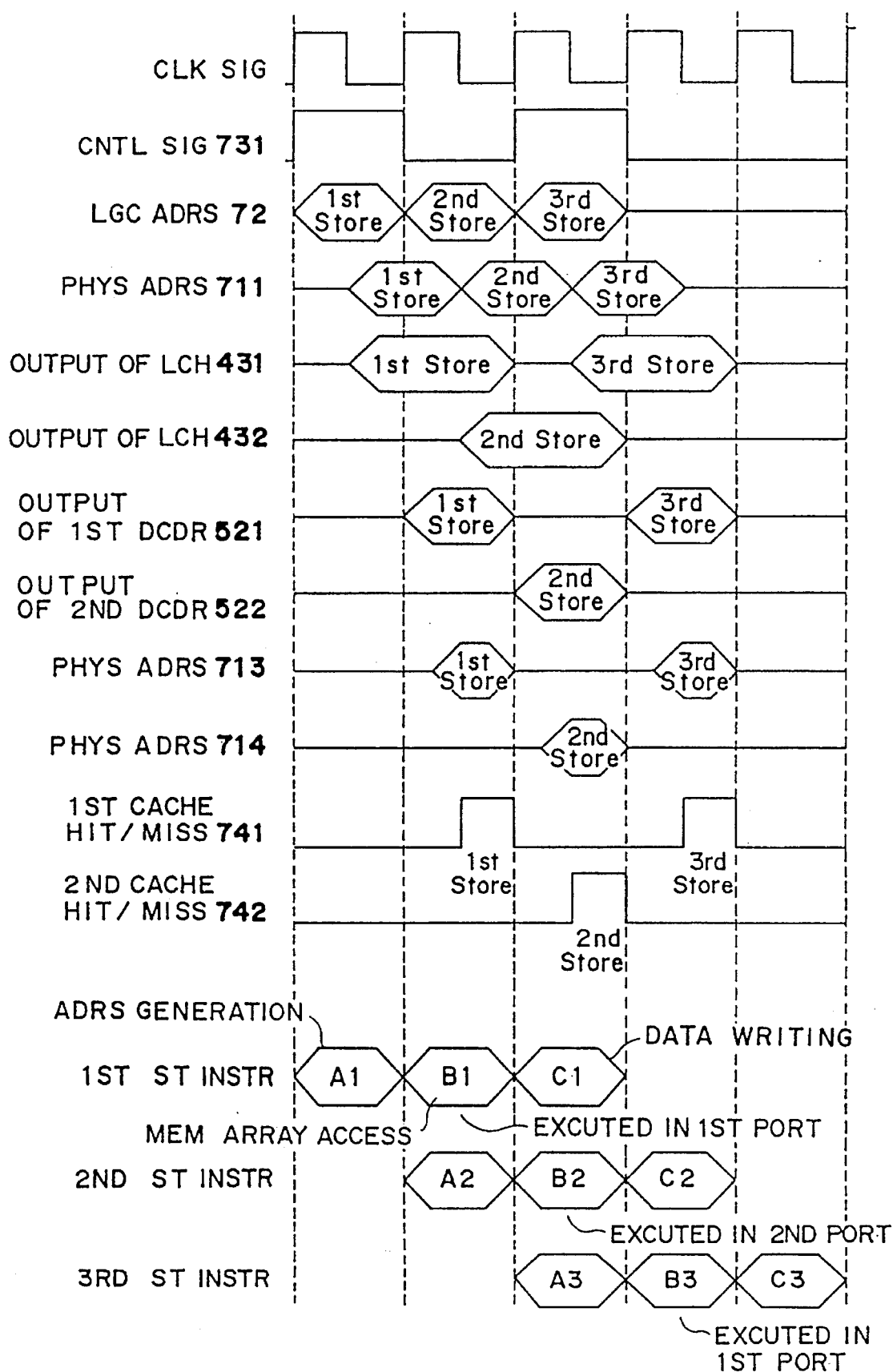
FIG. 2 is a sequence chart describing the operation of the first embodiment when plural store instructions are consecutively executed.

It is to be noted that, as shown in FIG. 1(b), two control signals 731, 732 are also available in the variation of the first embodiment. A control signal 732 is the reversed signal of the control signal 731, a latch 433 is the same as the latch 431, and the other components are constructed in the same manner as shown in FIG. 1(a) and shown by the same reference numerals as in FIG. 1(a). The operation of the microprocessor in FIG. 1(b) is the same as that of FIG. 1(a).

In addition, dual port cache memory devices can be classified by what are stored in them. Dual port cache memory devices for a single processor architecture are classified into a dual port data cache memory device which stores data in it, a dual port instruction cache memory device which stores instructions in it, or the like. Therefore, when a single processor contains a dual port data cache memory, the address generated from the address convertor 42 is a data address. On the other hand, when a microprocessor contains a dual port instruction cache memory device, the address generated from the address convertor 42 is an instruction address.

Second Embodiment

Figure 3A:
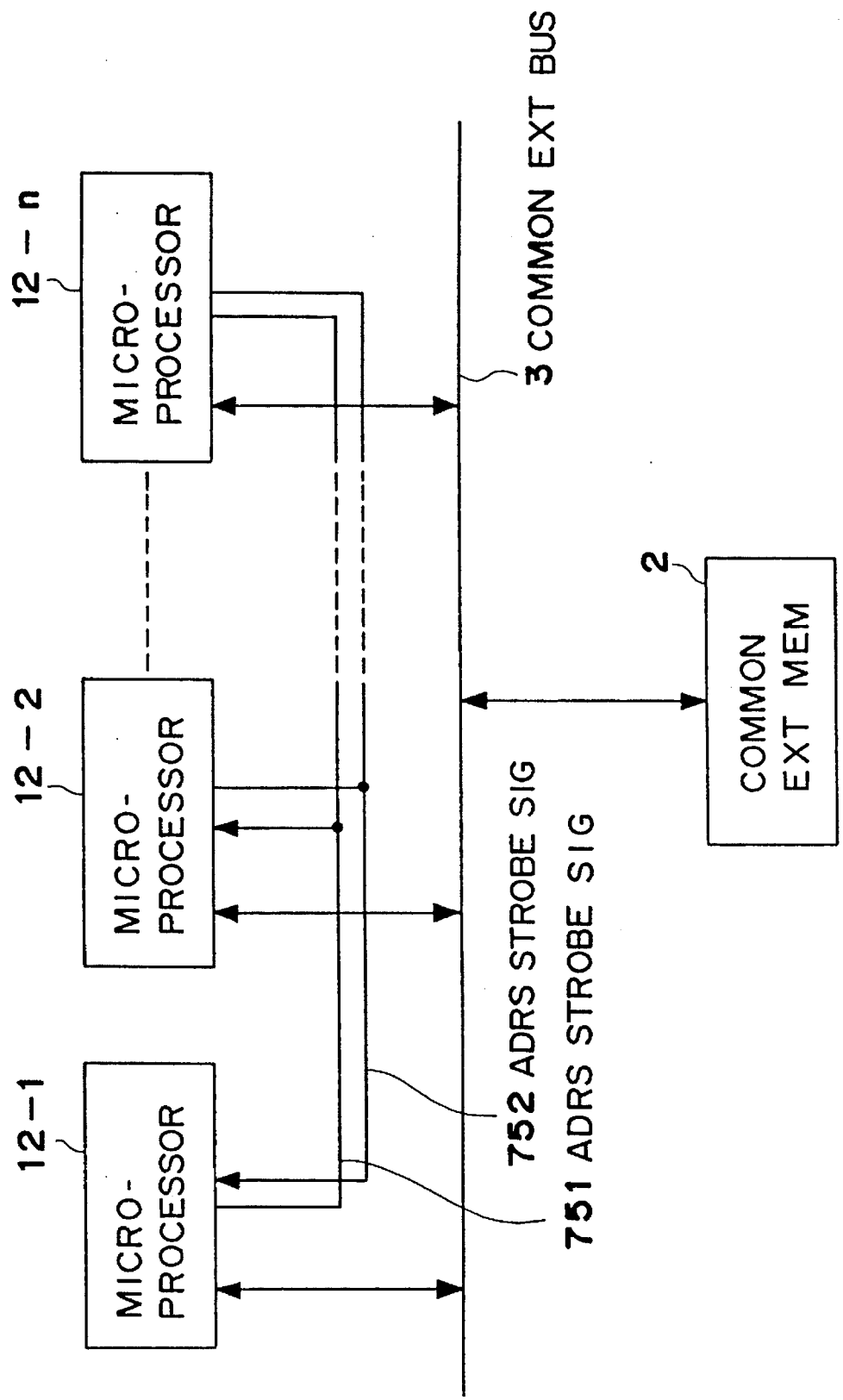
FIG. 3(a) is a block diagram of microprocessors have a multiprocessor architecture according to a second embodiment of the present invention.

The second embodiment of the present invention relates to a microprocessor with a multiprocessor architecture as shown in the block diagrams of FIG. 3(a). FIG. 3(a) is a block diagram of the multiprocessor architecture wherein the plural microprocessors 12-1, ..., 12-n are connected to each other and to a common external memory 2 by a common external bus 3. For example, when one microprocessor 12-2 outputs a physical address to the common external bus 3, it simultaneously outputs an address strobe signal 752 indicating priority control of the common bus 3 to the other microprocessors 12-1, and 12-3, ..., 12-n. In turn, the other microprocessors 12-1, and 12-3, ..., 12-n can determine the availability of the common external bus 3 by means of the address strobe signal 752, thus preventing competition for the bus and achieving a bus snoop function.

The construction of a microprocessor adapted to a multiprocessor architecture is shown in FIG. 3(b). This microprocessor 12 comprises a CPU 41, an address converter 42 to convert the logical address 72 generated by the CPU 41 to a physical address 711, and controller 462 which controls the timing at which the physical address 712 supplied via the common external bus 3 is supplied to a selector 441, based on a control signal 731 output from the CPU 41, the state of which changes synchronized to the clock signal while an instruction operating the memory is generated, and an address strobe signal 751. The microprocessor 12 also includes a controller 461 which generates a control signal 733 based on the control signal 731 and the address strobe signal 752, and a selector 441 selects according to the control signal 733 either the physical address 711 or the physical address 712 which is the output from the controller 462. The microprocessor 12 further comprises a latch 431 which stores the physical address 711 when the control signal 731 is in a HIGH state, a latch 432 which stores the physical address that is the output from the selector 441 when the control signal 731 is in a LOW state and a dual port cache memory device 5. The dual port cache memory device 5 includes a first decoder 521 which functions using the second part of the physical address output by the latch 431, a second decoder 522 which functions using the second part of the physical address output by the latch 432, and dual port memory arrays 511, 512 which can be independently accessed by either a first port connected to the first decoder 521 or a second port connected to the second decoder 522. The dual port cache memory device 5 further includes a first comparator 531 which compares the first part of the physical address output by the latch 431 with the physical address 713 read from the dual port memory array 511 to determine if they are the same address, a second comparator 532 which compares the first part of the physical address output by the latch 432 with the physical address 714 read from the dual port memory array 511 to determine if they are the same address, a delay means 451 to delay the control signal 733 one cycle, and a logic circuit 551 to separate the output of the second comparator 532 into either cache hit/miss signals 742 or snoop hit/miss signals 744 based on the output of the delay means 451. The dual port cache memory device 5 still further includes a first tri-state buffer 541 to cause a first data read from the dual port memory array 512 to pass therethrough only when the first comparator 531 outputs a cache hit signal which represents that the first part of the physical address 711 from the latch 431 and the physical address 713 from the dual port memory array 511 are the same address, that is, a first port side is of a hit, and a second tri-state buffer 542 to cause a second data read from the dual port memory array 512 to pass therethrough only when the second comparator 532 outputs a cache hit signal which represents that the first part of the physical address 711 from the latch 432 and the physical address 714 from the dual port memory array 511 are the same address, that is, a second port side is of a hit.

Also shown in FIG. 3(a) are the address strobe signal 751 which indicates that the physical address 711 was output to the common external bus 3, and the address strobe signal 752 supplied from one microprocessor to the other microprocessors to indicate that a physical address 712 has been output from the sending microprocessor.

Figure 3C:
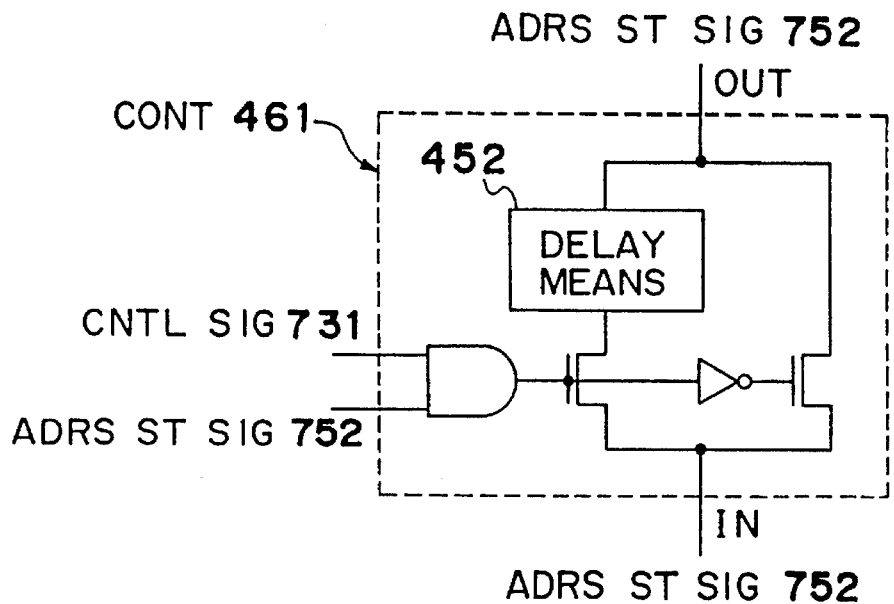
FIGS. 3(c) and 3(d) are respective block diagrams of a controller.
Figure 3D:
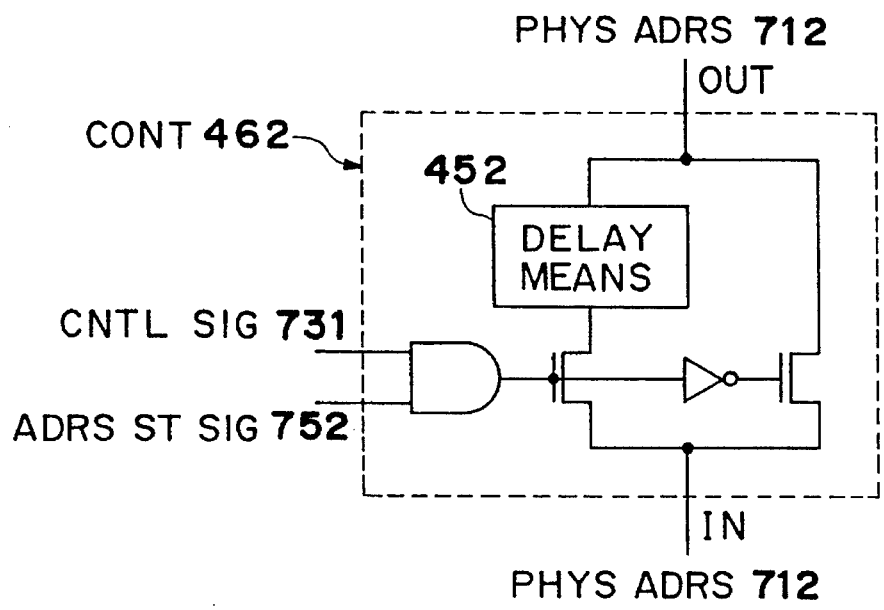
Figure 3E:
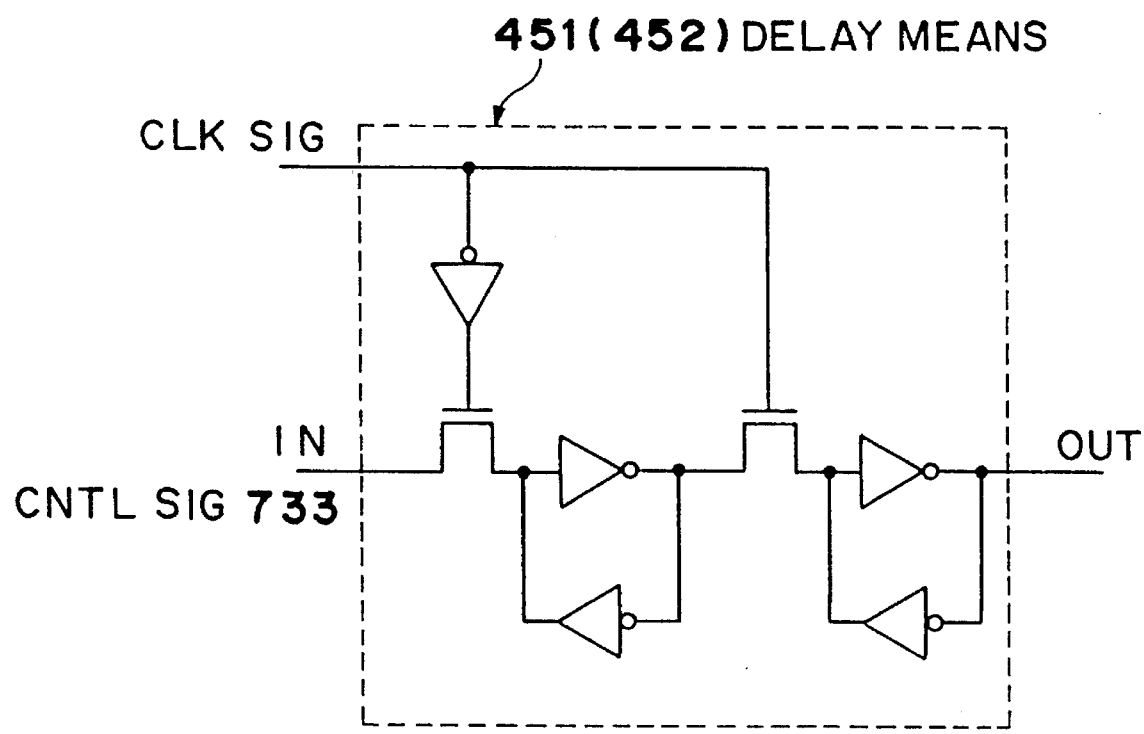
FIG. 3(e) is a block diagram of a delay means.
Figure 5:
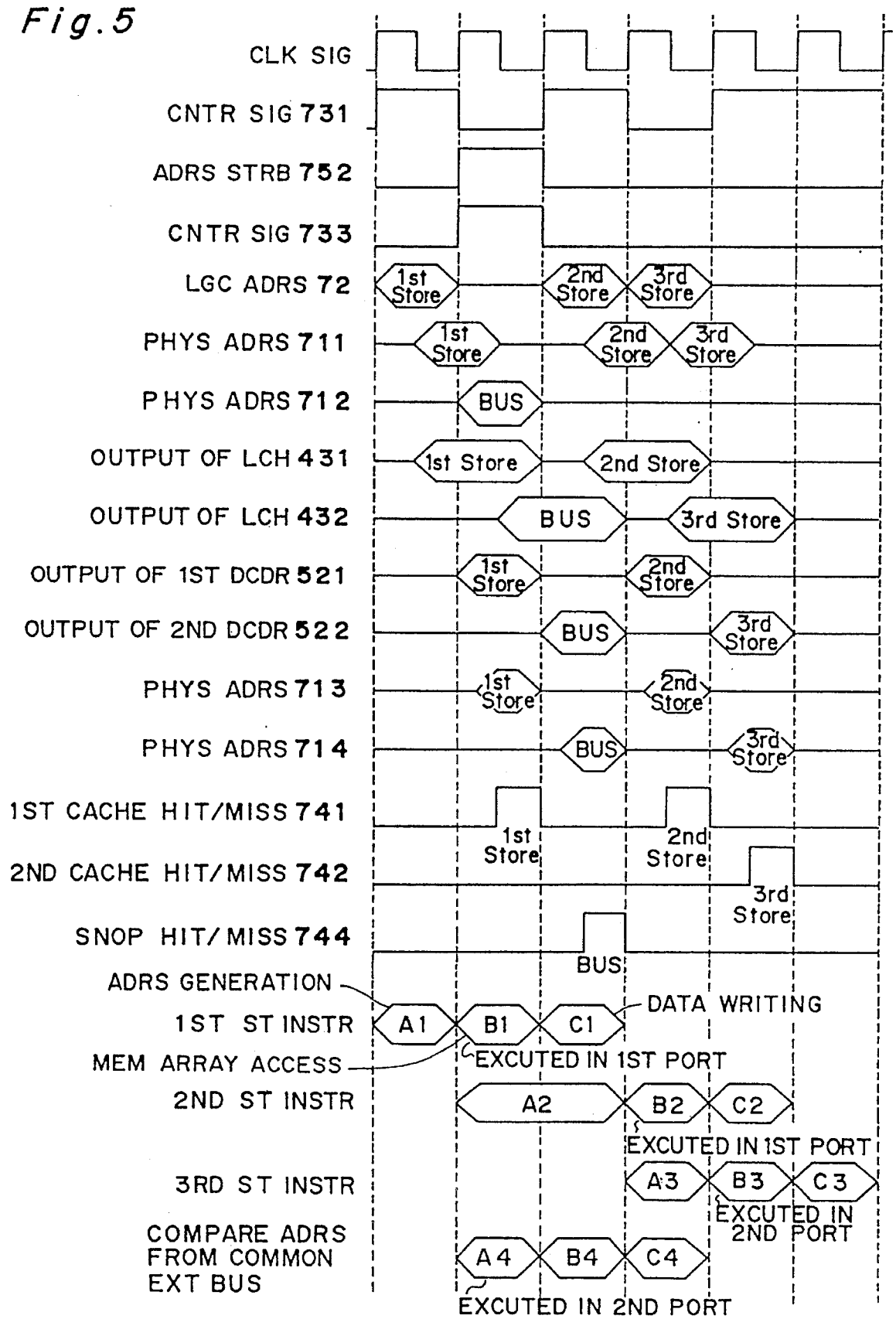
FIG. 5 is a sequence chart describing the operation of the second embodiment when a physical address is supplied from the common bus and the address can be immediately stored by a latch.
Figure 6:
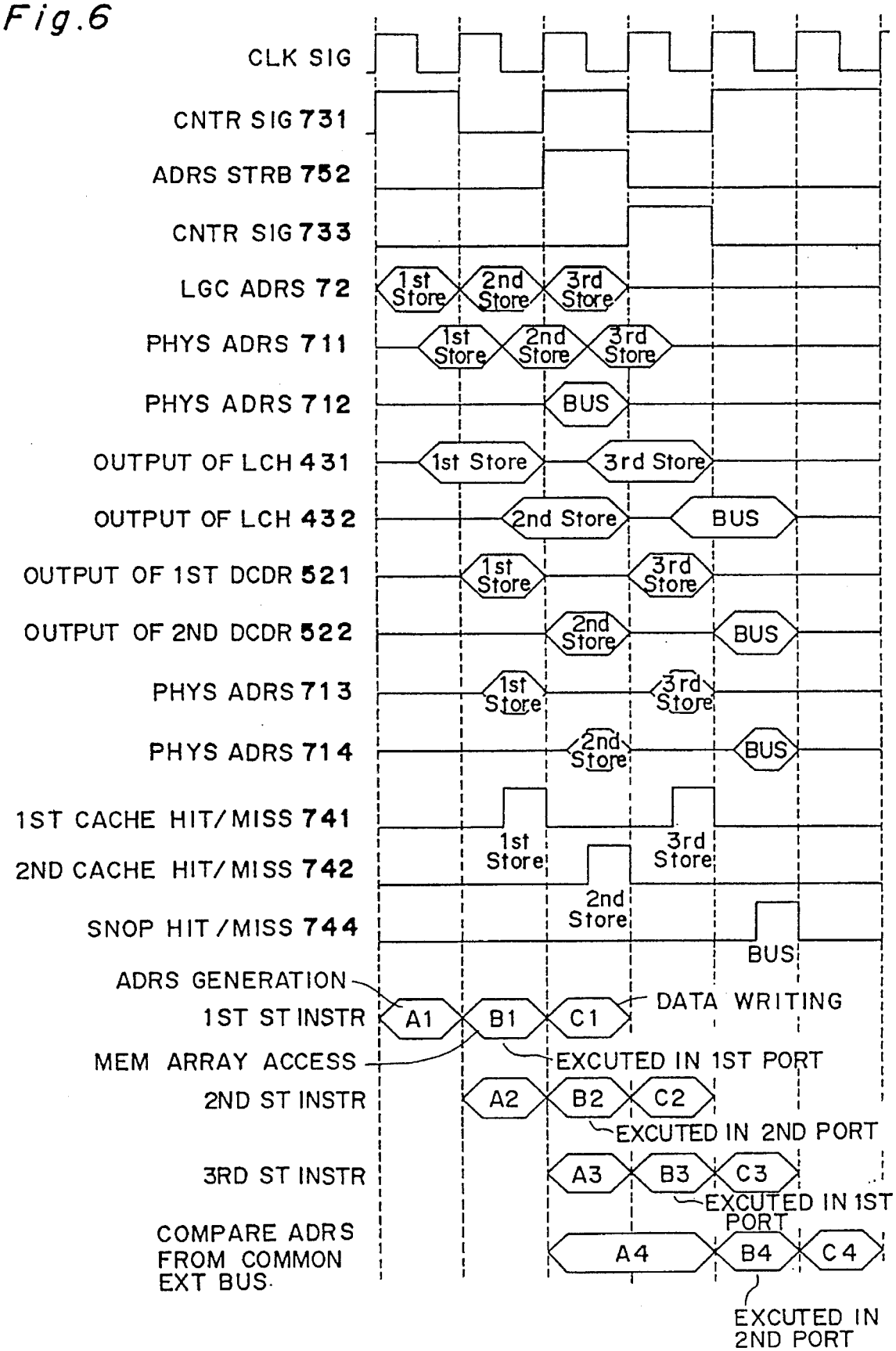
FIG. 6 is a sequence chart describing the operation of the second embodiment when plural store instructions are consecutively executed when the physical address is supplied from the common bus and the address cannot be immediately stored by the latch.

It is to be noted that the means for generating the control signal 731 from the CPU 41 and the address converter 42 are the same as those described with reference to the first embodiment hereinabove. Simple block diagrams showing the controllers 461 and 462 are shown in FIGS. 3(c) and 3(d). When the address strobe signal 752 is LOW (i.e., the physical address 712 and address strobe signal 752 are not supplied), the input signal to the controllers 461 and 462 is passed straight through to the output. When the address strobe signal 752 is HIGH and the control signal 731 is LOW (i.e., the physical address 712 and the address strobe signal 752 are supplied and the physical address 712 can be stored to the enabled latch 432), the input signal is passed straight through to the output. When the address strobe signal 752 is HIGH and the control signal 731 is HIGH (i.e., the physical address 712 and the address strobe signal 752 are supplied and the physical address 712 cannot be stored to the latch 432), the input signal is delayed one cycle by the delay means 452 before being output. The delay means 451 and 452 use a means to delay the control signal 733 one cycle synchronized to the clock signal as shown in FIG. 3(e).

The microprocessor 12 having the above function blocks is connected to the common external bus 3 through buses for physical addresses 711 and 712 to exchange data with the other microprocessors and devices. Furthermore, the first decoder 521 and the second decoder 522 both output the same output for any same input.

The operation of the second embodiment is described hereinbelow with reference to FIGS. 3(a)–3(e) and FIGS. 4–6. That case in which the successive memory operation instruction is three consecutive store instructions is described by way of example. It is furthermore assumed that the initial state of the control signal 731 is LOW.

(1) When the physical address 712 is not supplied

The operation for that case in which the physical address 712 is not supplied from the common external bus 3 is described first with reference to FIGS. 3(a), 3(b), 3(d) and 3(e), and 4. In this case the address strobe signal 752 is always LOW; thus the selector 441 input is always switched to the physical address 711 side, and the logic circuit 551 output is always switched to the cache hit/miss signal 742 side.

When the first store instruction is executed, the logical address 72 is output from the CPU 41 and converted to a physical address 711 by the address converter 42. When the CPU 41 recognizes that a memory operation instruction was executed, it changes the control signal 731 from a LOW to a HIGH state, and sets the enabling portion of the latch 431 an ON state and the enabling portion of the other latch 432 an OFF state, thus enabling the physical address 711, which is the output from the address converter 42, to be stored by the first latch 431. The operation to this point requires one clock cycle, which is the address generation cycle for the first store instruction.

In the next cycle, the set address is selected from the first port using the second part of the latch 431 output to access the dual port memory array 511 according to the first store instruction, and the physical address 713, which is stored in the dual port memory array 511 at the indicated set address, is output. This physical address 713 and the first part of the latch 431 output are then compared by the first comparator 531 to determine if they are the same; if they are, a cache hit signal 741 is output, and if they are not, a cache miss signal 741 is output. The CPU 41 simultaneously executes the second store instruction and outputs the current logical address 72. In addition, the control signal 731 changes from a HIGH to a LOW state, the enabling portion of the latch 431 becomes OFF and the enabling portion of the other latch 432 becomes ON, thus storing the physical address 711, which is the output of the address converter 42, to the enabled latch 432. Thus, this second cycle is the cycle in which the dual port memory array 511 is accessed according to the first store instruction and the cycle in which the address is generated for the second store instruction, both operations being completed with no interference therebetween and no penalty occurring.

In the next cycle, the set address is selected from the second port using the second part of the latch 432 output to access the dual port memory array 511 according to the second store instruction, and the physical address 714, which is stored in the dual port memory array 511 at the indicated set address, is output. This physical address 714 and the first part of the latch 432 output are then compared by the second comparator 532 to determine if they are the same; if they are, a cache hit signal 742 is output, and if they are not, a cache miss signal 742 is output. The CPU 41 simultaneously executes the third store instruction and outputs the current logical address 72. In addition, the control signal 731 changes from a LOW to a HIGH state, the enabling portion of the latch 431 becomes ON and the enabling portion of the other latch 432 becomes OFF, thus storing the physical address 711, which is the output of the address converter 42, to the enabled latch 431. Thus, this third cycle is the cycle in which the dual port memory array 511 is accessed according to the second store instruction and the cycle in which the address is generated for the third store instruction, both operations being completed with no interference therebetween and no penalty occurring.

In the last cycle, the set address is selected from the first port using the second part of the latch 431 output to access the dual port memory array according to the third store instruction, and the physical address 713, which is stored in the dual port memory array 511 at the indicated set address, is output. This physical address 713 and the first part of the latch 431 output are then compared by the first comparator 531 to determine if they are the same; if they are, a cache hit signal 741 is output, and if they are not, a cache miss signal 741 is output. Thus, this cycle is that in which the dual port memory array is accessed according to the third store instruction.

As thus described, a microprocessor according to the second embodiment of the invention can output cache hit/miss signals 741 and 742 at each cycle without any penalty when memory operation instructions are consecutively output when the physical address is not supplied from the common external bus 3.

(2) When the physical address 712 is supplied and can be immediately stored to the latch 432

Microcomputer operation for that case in which the physical address 712 is supplied from the common external bus 3 and can be immediately stored to the enabled latch 432 is described hereinbelow with reference to FIGS. 3(a), 3(b), 3(c), 3(d) and 3(e), and 5. It is herein assumed that the physical address 712 is supplied in the second cycle. In addition, the physical address 712 from the common external bus 3 has higher priority than the physical address 711 at the CPU 41. This is the bus snoop function, which is required because it is necessary to invalidate the data as soon as possible when the data contents of the cache memory device 5 and the common external memory 2 differ.

When the first store instruction is executed, the logical address 72 is output from the CPU 41 and converted to a physical address 711 by the address converter 42. When the CPU 41 recognizes that a memory operation instruction was executed, it changes the control signal 731 from a LOW to a HIGH state, and sets the enabling portion of the latch 431 an ON state and the enabling portion of the other latch 432 an OFF state, thus enabling the physical address 711, which is the output from the address converter 42, to be stored by the first latch 431. The operation to this point requires one clock cycle, which is the address generation cycle for the first store instruction.

In the next cycle, the set address is selected from the first port using the second part of the latch 431 output to access the dual port memory array 511 according to the first store instruction, and the physical address 713, which is stored in the dual port memory array 511 at the indicated set address, is output. This physical address 713 and the first part of the latch 431 output are then compared by the first comparator 531 to determine if they are the same; if they are, a cache hit signal 741 is output, and if they are not, a cache miss signal 741 is output. The CPU 41 simultaneously tries to execute the second store instruction and outputs the current logical address 72, changing the control signal 731 from a HIGH to a LOW state, and switching the enabling portion of the latch 431 an OFF state and the enabling portion of the other latch 432 an ON state, thus storing the physical address 711, which is the output of the address converter 42, to the enabled latch 432. However, the address strobe signal 752 becomes HIGH and the higher priority physical address 712 is supplied from the common external bus 3. At this time, because the controllers 461 and 462 are in the state which outputs the input signal straight through, the selector 441 switches from the one physical address 711 side to the other physical address 712 side, causing the physical address 712 to be output from the selector 441 and storing the address in the latch 432. Furthermore, the CPU 41 delays the output cycle of the logical address for the second store instruction one cycle due to the state of the control signal 733 output by the controller 461. As a result, this second cycle is the cycle in which the dual port memory array 511 is accessed according to the first store instruction and the cycle in which the address is generated for the physical address 712 supplied from the other microprocessors, both operations being completed with no interference therebetween and no penalty occurring. Simultaneous with the completion of this cycle, the address strobe signal 752 changes to LOW.

In the next cycle, the set address is selected from the second port using the second part of the output from the latch 432 to access the dual port memory array 511 at the physical address 712 supplied from the other microprocessor, and the physical address 714, which is stored in the dual port memory array 511 at the selected set address, is output. This physical address 714 and the first part of the latch 432 output are then compared by the second comparator 532 to determine if they are the same. By means of the control signal 733 which was HIGH in the previous cycle and delayed one cycle by the delay means 451, the second comparator 532 output is switched by the logic circuit 551 to the snoop side, and if a match is confirmed, a snoop hit signal 744 is output, a snoop miss signal 744 being output if a match is not confirmed. The CPU 41 simultaneously executes the second store instruction and outputs the current logical address 72. In addition, the control signal 731 changes from a LOW to a HIGH state, the enabling portion of the latch 431 becomes ON and the enabling portion of the other latch 432 becomes OFF, thus storing the physical address 711, which is the output of the address converter 42, to the enabled latch 431. Thus, this cycle is that in which the dual port memory array 511 is accessed at the physical address 712 supplied from the other microprocessors, and the address is generated for the second store instruction, both operations being completed with no interference therebetween and no penalty occurring.

In the next cycle, the set address is selected from the first port using the second part of the output from the latch 431 to access the dual port memory array 511 according to the second store instruction, and the physical address 713, which is stored in the dual port memory array 551 at the selected set address, is output. This physical address 713 and the first part of the latch 431 output are then compared by the first comparator 531 to determine if they are the same; if they are, a cache hit signal 741 is output, and if they are not, a cache miss signal 741 is output. The CPU 41 simulta- neously executes the third store instruction and outputs the current logical address 72. In addition, the control signal 731 changes from a HIGH to a LOW state, the enabling portion of the latch 431 becomes OFF and the enabling portion of the other latch 432 becomes ON, thus storing the physical address 711, which is the output of the address converter 42, to the enabled latch 432. Thus, this cycle is that in which the dual port memory array 511 is accessed according to the second store instruction, and the address is generated for the third store instruction, both operations being completed with no interference therebetween and no penalty occurring.

In the last cycle, the set address is selected from the second port using the second part of the latch 432 output to access the dual port memory array 511 according to the third store instruction, and the physical address 714, which is stored in the dual port memory array 511 at the indicated set address, is output. This physical address 714 and the first part of the latch 432 output are then compared by the second comparator 532 to determine if they are the same. By means of the control signal 733 which was LOW in the previous cycle and delayed one cycle by the delay means 451, the second comparator 532 output is switched by the logic circuit 551 to the cache side, and if a match is confirmed, a cache hit signal 742 is output, a cache miss signal 742 being output if a match is not confirmed. Thus, this cycle is that in which the dual port memory array 511 is accessed according to the third store instruction.

As thus described hereinabove, a microprocessor according to the second embodiment of the invention can output cache hit/miss signals 741 and 742 and snoop hit/miss signals 744 at each cycle when the physical address is supplied from the common external bus 3, reducing the occurrence of penalties when memory operation instructions are consecutively output.

(3) When the physical address 712 is supplied and cannot be immediately stored to the latch 432

Microprocessor operation for that case in which the physical address 712 is supplied from the common external bus 3 and cannot be immediately stored to the latch 432 is described hereinbelow with reference to FIGS. 3(a), 3(b), 3(c), 3(d) and 3(e), and 6. It is herein assumed that the physical address 712 is supplied in the third cycle.

When the first store instruction is executed, the logical address 72 is output from the CPU 41 and converted to a physical address 711 by the address converter 42. When the CPU 41 recognizes that a memory operation instruction was executed, it changes the control signal 731 from a LOW to a HIGH state, and sets the enabling portion of the latch 431 an ON state and the enabling portion of the other latch 432 an OFF state, thus enabling the physical address 711, which is the output from the address converter 42, to be stored by the first latch 431. The operation to this point requires one clock cycle, which is the address generation cycle for the first store instruction.

In the next cycle, the set address is selected from the first port using the second part of the latch 431 output to access the dual port memory array 511 according to the first store instruction, and the physical address 713, which is stored in the dual port memory array 511 at the indicated set address, is output. This physical address 713 and the first part of the latch 431 output are then compared by the first comparator 531 to determine if they are the same; if they are, a cache hit signal 741 is output, and if they are not, a cache miss signal 741 is output. The CPU 41 simultaneously executes the second store instruction and outputs the current logical address 72, changing the control signal 731 from a HIGH to a LOW state, and switching the enabling portion of the latch 431 an OFF state and the enabling portion of the other latch 432 an ON state, thus storing the physical address 711, which is the output of the address converter 42, to the enabled latch 432. As a result, this second cycle is the cycle in which the dual port memory array 511 is accessed according to the first store instruction and the cycle in which the address is generated for the second store instruction, both operations being completed with no interference therebetween and no penalty occurring.

In the next cycle, the set address is selected from the second port using the second part of the output from the latch 432 to access the dual port memory array according to the second store instruction, and the physical address 714, which is stored in the dual port memory array 511 at the selected set address, is output. This physical address 714 and the first part of the latch 432 output are then compared by the second comparator 532 to determine if they are the same. By means of the control signal 733 which was LOW in the previous cycle and delayed one cycle by the delay means 451, the second comparator 532 output is switched by the logic circuit 551 to the cache side, and if a match is confirmed, a cache hit 742 is output, a cache miss 742 being output, if a match is not confirmed. The CPU 41 simultaneously executes the third store instruction and outputs the current logical address 72. In addition, the control signal 731 changes from a LOW to a HIGH state, the enabling portion of the latch 431 becomes ON and the enabling portion of the other latch 432 becomes OFF, thus storing the physical address 711, which is the output of the address converter 42, to the enabled latch 431. At this time the address strobe signal 752 becomes HIGH and the higher priority physical address 712 is supplied from the common external bus 3. However, because the enabling portion of the latch 432 is OFF at this time, the physical address 712 cannot be immediately stored therein. Furthermore, because the controllers 461 and 462 are in the state which delays the input signal one cycle before passing it to the output, the physical address 712 does not actually reach the latch 432 until one cycle later. As a result, this cycle is that in which the dual port memory array 511 is accessed according to the second store instruction and the address is generated for the third store instruction, both operations being completed with no interference therebetween and no penalty occurring.

In the next cycle, the set address is selected from the first port using the second part of the output from the latch 431 to access the dual port memory array 511 according to the third store instruction, and the physical address 713, which is stored in the dual port memory array 511 at the selected set address, is output. This physical address 713 and the first part of the latch 431 output are then compared by the first comparator 531 to determine if they are the same; if they are, a cache hit signal 741 is output, and if they are not, a cache miss signal 741 is output. In addition, the control signal 731 changes from a HIGH to a LOW state, the enabling portion of the latch 431 becomes OFF and the enabling portion of the other latch 432 becomes ON. In addition, the selector 441 is switched from the CPU side to the common bus side by the address strobe signal 752, and the physical address 712 is stored to the enabled latch 432. Thus, this cycle is that in which the dual port memory array 511 is accessed according to the third store instruction, and the address is generated for the physical address 712 supplied from one of the other microprocessors, both operations being completed with no interference therebetween and no penalty occurring. When this cycle is completed, the control signal 733 simultaneously becomes LOW.

In the last cycle, the address is selected from the second port using the second part of the latch 432 output to access the dual port memory array 511 at the physical address 712 supplied from the other microprocessor, and the physical address 714, which is the content of the tag at the indicated address, is output from the dual port memory array 511. This physical address 714 and the first part of the latch 432 output are then compared by the second comparator 532 to determine if they are the same. By means of the control signal 733 which was HIGH in the previous cycle and delayed by the delay means 451, the second comparator 532 output is switched by the logic circuit 551 to the snoop side, and if a match is confirmed, a snoop hit signal 744 is output, a snoop miss signal 744 being output if a match is not confirmed. Thus, this cycle is that in which the dual port memory array 511 is accessed according to the physical address 712 supplied from one of the other microprocessors.

As thus described hereinabove, a microprocessor according to the second embodiment of the invention can output cache hit/miss signals and snoop hit/miss signals at each cycle when the physical address is supplied from the common external bus 3, reducing the occurrence of penalties when memory operation instructions are consecutively output.

Incidentally, the CPU 41 of the microprocessor 12 outputs only one sort of control signal as shown in FIG. 3(*b*), but the microprocessor using two control signals output from CPU can be easily realized in the similar manner as shown in FIG. 1(*b*).

Referring to the two physical addresses 711 and 712 in this case, it is generally considered that a physical address generated from the first address convertor 42 is a data address and a physical address generated from a second address generation means is a bus address supplied through the common external bus 3, or that a physical address generated from the first address convertor 42 is a data address and a physical address generated from the second generation means is an instruction address.

Third Embodiment

Figure 7:
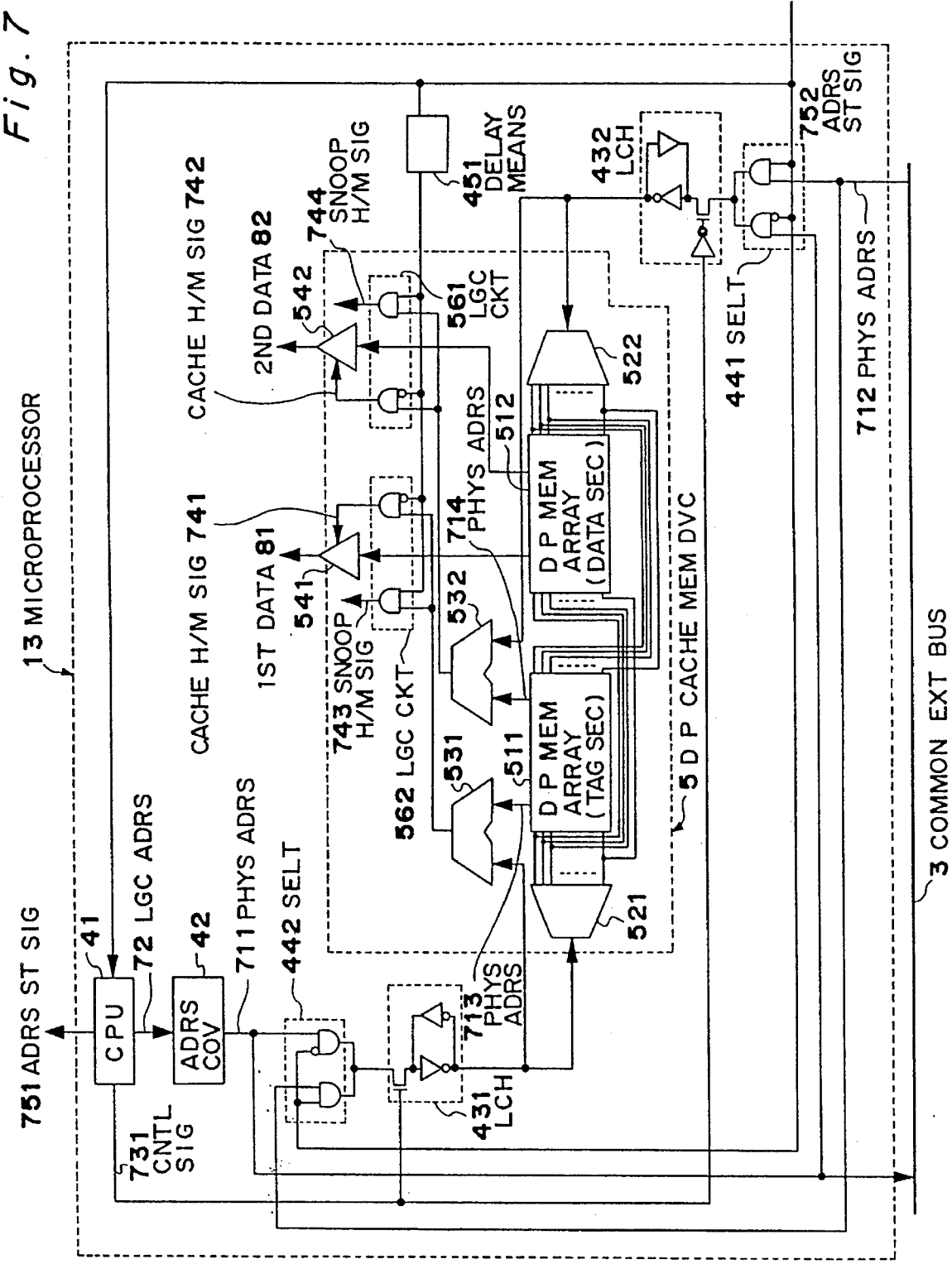
FIG. 7 is a block diagram of a microprocessor according to a third embodiment of the present invention.

A block diagram of a microprocessor according to a third embodiment of the present corresponding to that with a multiprocessor architecture as shown in the block diagrams of FIG. 3(*a*) is shown in FIG. 7. This microprocessor 13 comprises a CPU 41, an address converter 42 to convert a logical address 72 generated by the CPU 41 to a physical address 711, a selector 441 which selects either the physical address 711 or a physical address 712 supplied via a common external bus 3, a selector 442 which selects either the physical address 711 or the physical address 712, a latch 431 which stores the physical address which is the output of the selector 442 when the control signal 731, the state of which changes synchronized to the clock signal while a memory operating instruction is generated, output from the CPU 41 is in a HIGH state, a latch 432 which stores the physical address that is the output from the selector 441 when the control signal 731 is in a LOW state, a delay means 451 to delay an address strobe signal 752 one cycle, and a dual port cache memory device 5. The dual port cache memory device 5 includes a first decoder 521 which functions using the second part of the physical address output by the latch 431, a second decoder 522 which functions using the second part of the physical address output by the latch 432, and dual port memory arrays 511, 512 which can be independently accessed by either a first port connected to the first decoder 521 or a second port connected to the second decoder 522. The dual port cache memory device further includes a first comparator 531 which compares the first part of the physical address output by the latch 431 with the physical address 713 read from the dual port memory array 511, a second comparator 532 which compares the first part of the physical address output by the latch 432 with the physical address 714 read from the dual port memory array 511, a logic circuit 562 to separate the first comparator 531 output into a cache hit/miss signal 741 or snoop hit/miss signal 743 according to the output of the delay means 451, and a logic circuit 561 to separate the output of the second comparator 532 into either cache hit/miss signal 742 or snoop hit/miss signal 744 based on the output of the delay means 451. The dual port cache memory device still further includes a first tri-state buffer 541 to cause a first data read from the dual port memory array 512 to pass therethrough only when the first comparator 531 outputs a cache hit signal which represents that the first part of the physical address 711 from the latch 431 and the physical address 713 from the dual port memory array 511 are the same address, that is, a first port side is of hit, and a second tri-state buffer 542 to cause a second data read from the dual port memory array 512 to pass therethrough only when the second comparator 532 outputs a cache hit signal which represents that the first part of the physical address 711 from the latch 432 and the physical address 714 from the dual port memory array 511 are the same address, that is, a second port side is of hit.

Also shown in FIG. 7 are an address strobe signal 751 which indicates that the physical address 711 was output to the common external bus 3, and an address strobe signal 752 supplied from the other microprocessors to indicate that a physical address 712 has been sent from the other microprocessor.

It is to be noted that the means for generating a control signal 731 in the CPU 41 and the address converter 42 are the same as those described with reference to the first embodiment hereinabove, and the delay means 451 is the same means as that described with reference to the second embodiment hereinabove.

The microprocessor 13 having the above function blocks is connected to the common external bus 3 through buses for physical addresses 711 and 712 to exchange data with the other microprocessors and devices. Furthermore, the first decoder 521 and the second decoder 522 both output the same output for any same input.

The operation of the third embodiment is described hereinbelow with reference to FIGS. 7–9. The case in which the successive memory operation instruction is three consecutive store instructions is described by way of example. It is furthermore assumed that the initial state of the control signal 731 is LOW.

(1) When the physical address 712 is not supplied

Figure 8:
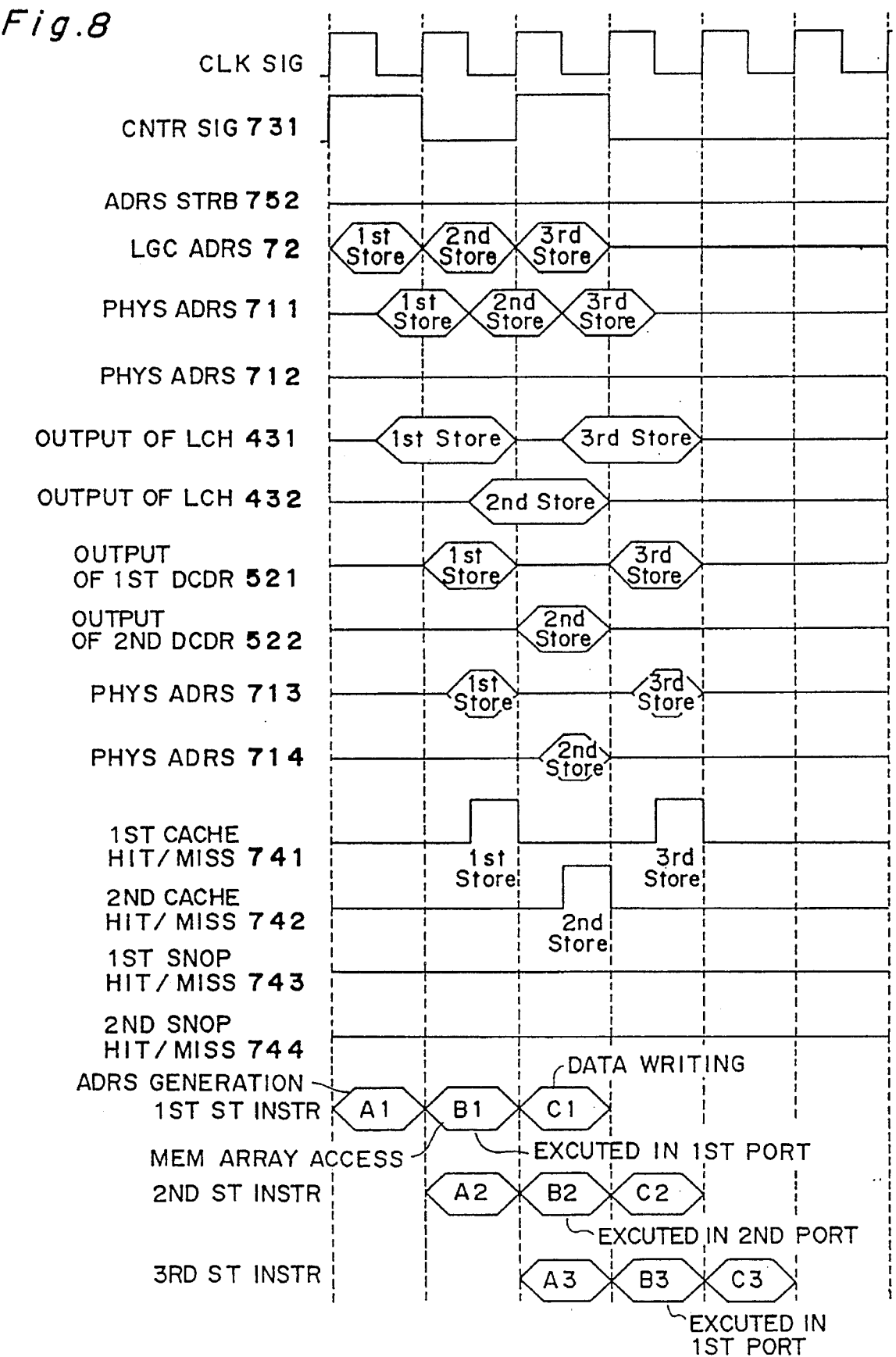
FIG. 8 is a sequence chart describing the operation of the third embodiment when a physical address is not supplied from a common bus.
Figure 9:
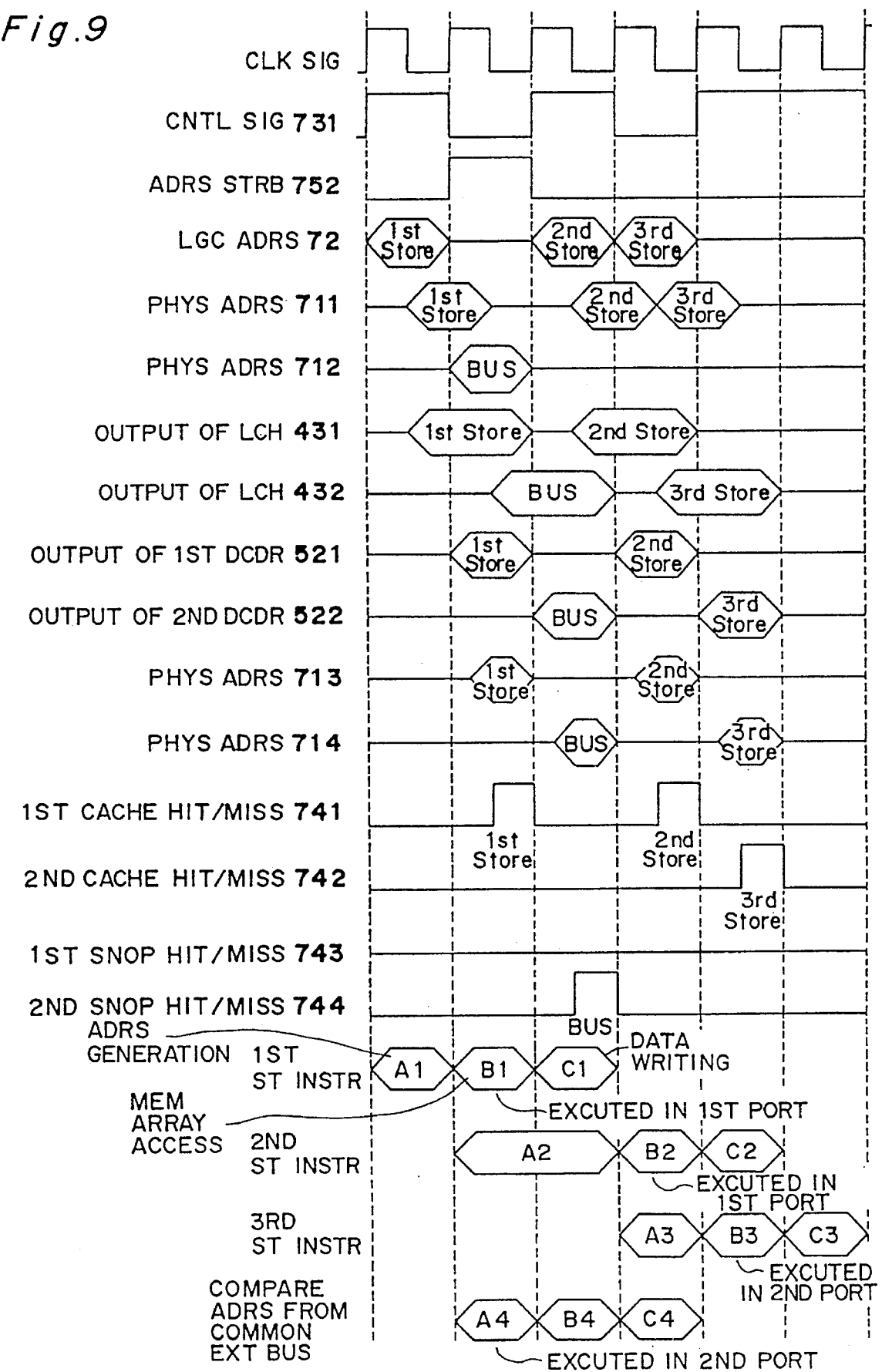
FIG. 9 is a sequence chart describing the operation of the third embodiment when the physical address is supplied from the common bus.
Figure 10:
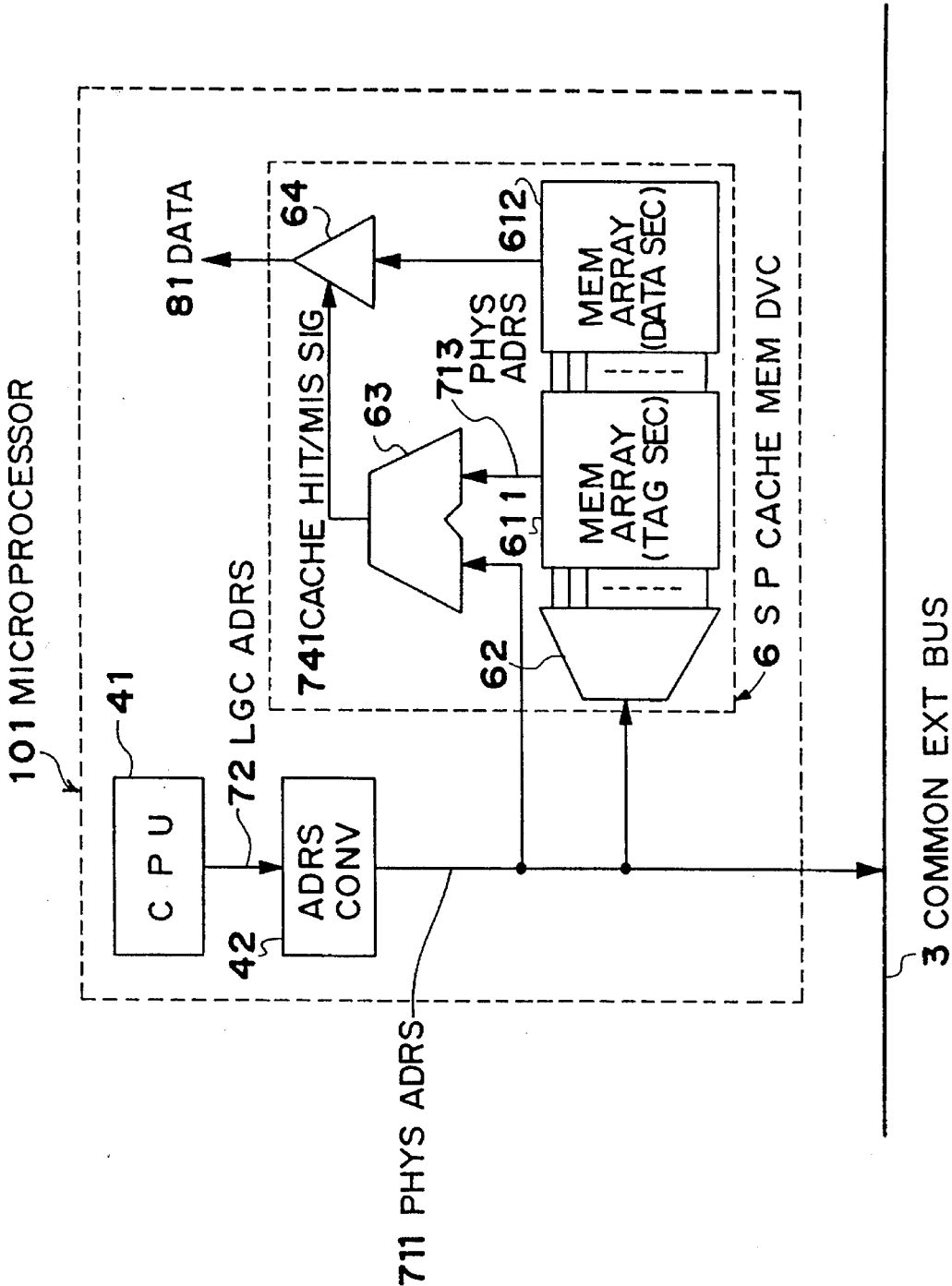
FIG. 10 is a block diagram of a conventional microprocessor.
Figure 11:
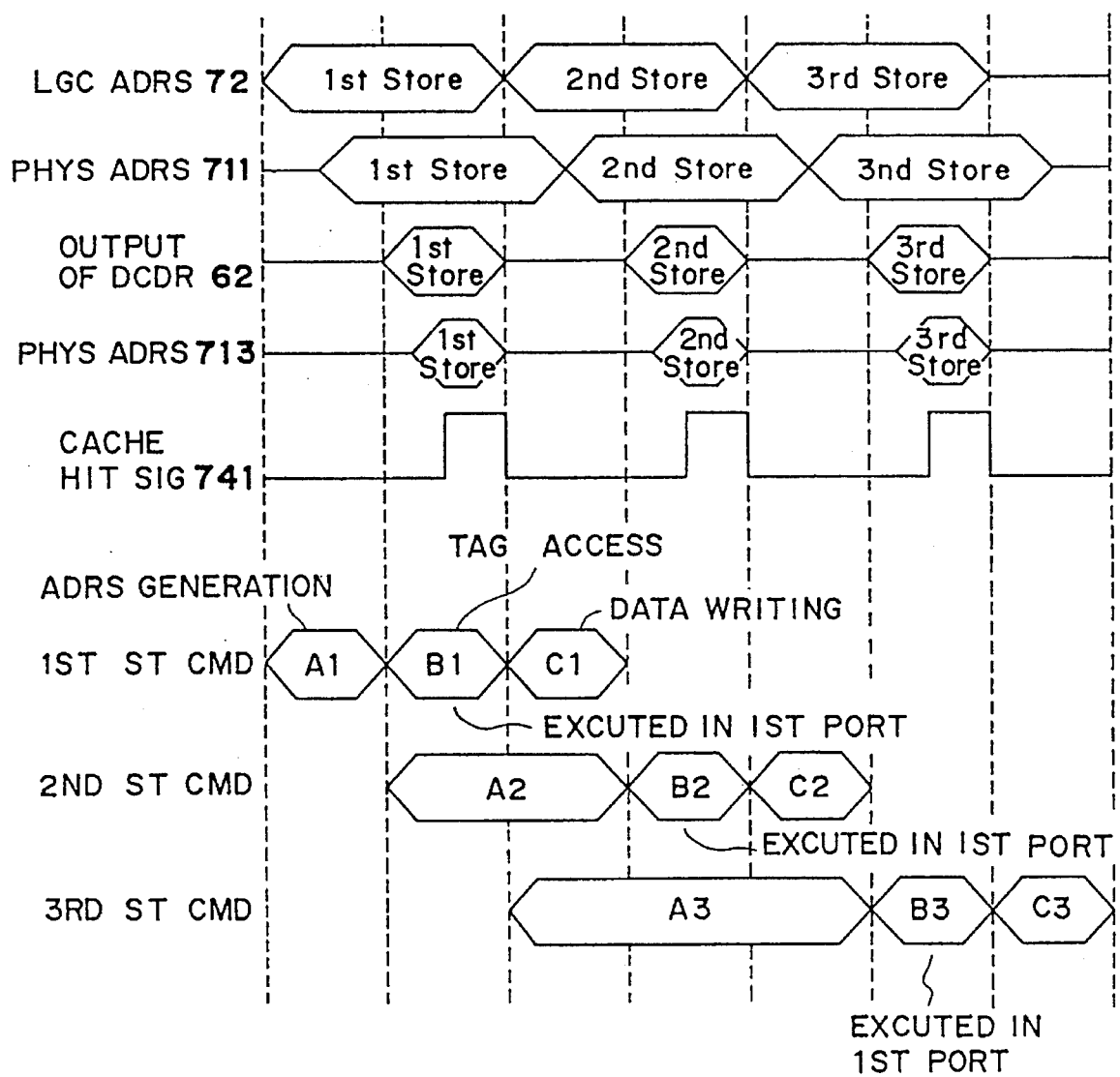
FIG. 11 is a sequence chart describing the operation of the conventional microprocessor.

The operation for that case in which the physical address 712 is not supplied from the common external bus 3 is described first with reference to FIGS. 7 and 8. In this case the address strobe signal 752 is always LOW; thus the selector 441 and 442 inputs are always set to the physical address 711 side, and the logic circuits 561, 562 outputs are always to the cache hit/miss signals 741 and 742 side.

When the first store instruction is executed, the logical address 72 is output from the CPU 41 and converted to a physical address 711 by the address converter 42. When the CPU 41 recognizes that a memory operation instruction was executed in the CPU 41, it changes the control signal 731 from a LOW to a HIGH state, and sets the enabling portion of the latch 431 an ON state, and the enabling portion of the other latch 432 an OFF state, thus enabling the physical address 711, which is the output from the address converter 42, to be stored through the selector 442 to the first latch 431. The operation to this point requires one clock cycle, which is the address generation cycle for the first store instruction.

In the next cycle, the set address is selected from the first port using the second part of the latch 431 output to access the dual port memory array 511 according to the first store instruction, and the physical address 713, which is stored in the dual port memory array 511 at the indicated set address, is output. This physical address 713 and the first part of the latch 431 output are then compared by the first comparator 531 to determine if they are the same; if they are, a cache hit signal 741 is output, and if they are not, a cache miss signal 741 is output. The CPU 41 simultaneously executes the second store instruction and outputs the current logical address 72. In addition, the control signal 731 changes from a HIGH to a LOW state, the enabling portion of the latch 431 becomes OFF and the enabling portion of the other latch 432 becomes ON, thus storing the physical address 711, which is the output of the address converter 42, through the selector 441 to the enabled latch 432. Thus, this second cycle is the cycle in which the dual port memory arrays 511, 512 are accessed according to the first store instruction and the cycle in which the address is generated for the second store instruction, both operations being completed with no interference therebetween and no penalty occurring.

In the next cycle, the set address is selected from the second port using the second part of the latch 432 output to access the dual port memory array 511 according to the second store instruction, and the physical address 714, which is stored in the dual port memory array 511 at the indicated set address, is output. This physical address 714 and the first part of the latch 432 output are then compared by the second comparator 532 to determine if they are the same; if they are, a cache-hit signal 742 is output, and if they are not, a cache miss signal 742 is output. The CPU 41 simultaneously executes the third store instruction and outputs the current logical address 72. In addition, the control signal 731 changes from a LOW to a HIGH state, the enabling portion of the latch 431 becomes ON and the enabling portion of the other latch 432 becomes OFF, thus storing the physical address 711, which is the output of the address converter 42, through the selector 442 to the enabled latch 431. Thus, this third cycle is the cycle in which the dual port memory arrays 511, 521 are accessed according to the second store instruction and the cycle in which the address is generated for the third store instruction, both operations being completed with no interference therebetween and no penalty occurring.

In the last cycle, the set address is selected from the first port using the second part of the latch 431 output to access the dual port memory array 511 according to the third store instruction, and the physical address 713, which is stored in the dual port memory array 511 at the indicated set address, is output. This physical address 713 and the first part of the latch 431 output are then compared by the first comparator 531 to determine if they are the same; if they are, a cache hit signal 741 is output, and if they are not, a cache miss signal 741 is output. Thus, this cycle is that in which the dual port memory arrays 511, 512 are accessed according to the third store instruction.

As thus described, a microprocessor according to the third embodiment of the invention can output cache hit/miss signals 741 and 742 at each cycle without any penalty when memory operation instructions are consecutively output when the physical address is not supplied from the common external bus 3.

(2) When the physical address 712 is supplied

Microprocessor operation for that case in which the physical address 712 is supplied from the common external bus 3 is described hereinbelow with reference to FIGS. 7 and 9. It is herein assumed that the physical address 712 is supplied in the second cycle. In addition, the physical address 712 from the common external bus 3 has higher priority than the physical address 711 at the CPU. This is the bus snoop function, which is required because it is necessary to invalidate the data as soon as possible when the data contents of the cache memory device 5 and the common external memory 2 differ.

When the first store instruction is executed, the logical address 72 is output from the CPU 41 and converted to a physical address 711 by the address converter 42. When the CPU 41 recognizes that a memory operation instruction was executed, it changes the control signal 731 from a LOW to a HIGH state, and sets the enabling portion of the latch 431 an ON state and the enabling portion of the other latch 432 an OFF state, thus enabling the physical address 711, which is the output from the address converter 42, to be stored by the first latch 431. The operation to this point requires one clock cycle, which is the address generation cycle for the first store instruction.

In the next cycle, the set address is selected from the first port using the second part of the latch 431 output to access the dual port memory array 511 according to the first store instruction, and the physical address 713, which is stored in the dual port memory array 511 at the indicated set address, is output. This physical address 713 and the first part of the latch 431 output are then compared by the first comparator 531 to determine if they are the same; if they are, a cache hit signal 741 is output, and if they are not, a cache miss signal 741 is output. The CPU 41 simultaneously executes the second store instruction, changing the control signal 731 from a HIGH to a LOW state, and switching the enabling portion of the latch 431 an OFF state and the enabling portion of the other latch 432 an ON state. However, the address strobe signal 752 becomes HIGH and the higher priority physical address 712 is supplied from the common external bus 3. Thus, the selector 441 switches from the physical address 711 side to the physical address 712 side, causing the physical address 712 to be output from the selector 441 and storing the physical address 712 in the latch 432. Furthermore, the CPU 41 delays the output cycle of the logical address for the second store instruction one cycle due to the state of the address strobe signal 752. As a result, this second cycle is the cycle in which the dual port memory arrays 511, 512 are accessed according to the first store instruction and the cycle in which the address is generated for the physical address 712 supplied from the other microprocessors, both operations being completed with no interference therebetween and no penalty occurring. Simultaneous with the completion of this cycle, the address strobe signal 752 changes to LOW.

In the next cycle, the set address is selected from the second port using the second part of the output from the latch 432 to access the dual port memory array 511 at the physical address 712 supplied from the other microprocessor, and the physical address 714, which is stored in the dual port memory array 511 at the selected set address, is output. This physical address 714 and the first part of the latch 432 output are then compared by the second comparator 532 to determine if they are the same. By means of the address strobe signal the previous cycle and delayed one cycle by the delay means 451, the second comparator 532 output is switched by the logic circuit 561 to the snoop side, and if a match is confirmed a snoop hit 744 is output, a snoop miss 744 being output if a match is not confirmed. The CPU 41 simultaneously executes the second store instruction and outputs the current logical address 72. In addition, the control signal 731 changes from a LOW to a HIGH state, the enabling portion of the latch 431 becomes ON and the enabling portion of the other latch 432 becomes OFF, thus storing the physical address 711, which is the output of the address converter 42, to the enabled latch 431. Thus, this cycle is that in which the dual port memory array is accessed at the physical address 712 supplied from the other microprocessors, and the address is generated for the second store instruction, both operations being completed with no interference therebetween and no penalty occurring.

In the next cycle, the set address is selected from the first port using the second part of the output from the latch 431 to access the dual port memory array 511 according to the second store instruction, and the physical address 713, which is stored in the dual port memory array 511 at the selected set address, is output. This physical address 713 and the first part of the latch 431 output are then compared by the first comparator 531 to determine if they are the same; if they are, a cache hit signal 741 is output, and if they are not, a cache miss signal 741 is output. The CPU 41 simultaneously executes the third store instruction and outputs the current logical address 72. In addition, the control signal 731 changes from a HIGH to a LOW state, the enabling portion of the latch 431 becomes OFF and the enabling portion of the other latch 432 becomes ON, thus storing the physical address 711, which is the output of the address converter 42, to the enabled latch 432. Thus, this cycle is that in which the dual port memory arrays 511, 512 are accessed according to the second store instruction, and the address is generated for the third store instruction, both operations being completed with no interference therebetween and no penalty occurring.

In the last cycle, the set address is selected from the second port using the second part of the latch 432 output to access the dual port memory array 511 according to the third store instruction, and the physical address 714, which is stored in the dual port memory array 511 at the indicated set address, is output. This physical address 714 and the first part of the latch 432 output are then compared by the second comparator 532 to determine if they are the same. By means of the address strobe signal 752 which was LOW in the previous cycle and delayed one cycle by the delay means 451, the second comparator 532 output is switched by the logic circuit 561 to the cache side, and if a match is confirmed, a cache hit signal 742 is output, a cache miss signal 742 being output if a match is not confirmed. Thus, this cycle is that in which the dual port memory arrays 511, 512 are accessed according to the third store instruction.

It is to be noted that even if the physical address 712 is supplied during execution of the third store instruction, the first port is selected and the same effect is obtained.

As thus described hereinabove, a microprocessor according to the third embodiment of the invention can output cache hit/miss signals 741 and 742 and snoop hit/miss signals 743 and 744 at each cycle when the physical address is supplied from the common external bus 3, reducing the occurrence of penalties when memory operation instructions occur consecutively.

The microprocessor of the third embodiment of the present invention uses only one control signal 731 as shown in FIG. 7, but the microprocessor using two control signal can be easily realized in the similar manner shown in FIG. 1(a) of the first embodiment.

Referring to two physical addresses 711 and 712 in this case, it is mainly considered that a physical address generated from a first address generation means, i.e. a first address convertor 42 is a data address and a physical address generated from a second address generation means is a bus address supplied through the common external bus 3, or that a physical address generated from the first address convertor 42 is a data address and a physical address generated from the second address generation means is an instruction address. It is also considered that a physical address generated from the first address convertor 42 is a data address and a physical address generated from the second address generation means is a branch address The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A microprocessor comprising:

an address generation means for generating a physical address;

first and second storage means for storing outputs of the address generation means;

a cache memory including (a) a dual port memory means for memorizing a tag address and data which can independently be accessed by means of second parts of the outputs of the first and second storage means, and (b) a first comparator which detects a match between a first part of an output from the first storage means and an output of the tag address of the dual port memory means accessed by a second part of the output of the first storage means, and (c) a second comparator which detects a match between a first part of an output from the second storage means and an output of the tag address of the dual port memory means accessed by a second part of the output of the second storage means; and a control means for outputting a control signal for accessing said cache memory by enabling portions of the first and second storage means to alternately become ON.

2. The microprocessor according to claim 1, wherein the physical address generated by the address generation means is a data address.

3. The microprocessor according to claim 1, wherein the physical address generated by the address generation means is an instruction address.

4. A microprocessor comprising:

first and second address generation means for generating physical addresses;

an address selector which selects an output of either of the first or second address generation means;

a first storage means for storing the outputs of the first address generation means;

a second storage means for storing an output of the address selector;

a cache memory including (a) a dual port memory means for memorizing a tag address and data which can independently be accessed by means of second parts of the outputs of the first and second storage means, and (b) a first comparator which detects a match between a first part of an output from the first storage means and an output of the tag address of the dual port memory means accessed by the second part of the output of the first storage means, and (c) a second comparator which detects a match between a first part of an output from the second storage means and an output of the tag address of the dual port memory means accessed by the second part of the output of the second storage means; and a control means which outputs a control signal for accessing said cache memory by selectively enabling said first and second storage means, and receives an address strobe signal, and causes the address selector to select the output of the first address generation means when the address strobe signal is in a first state, and causes the address selector to select the output of the second address generation means when the address strobe signal is in a second state.

5. A microprocessor according to claim 4, wherein said control means comprises:

a first control part which outputs a control signal for causing the enabling portions of the first and second storage means to alternately become ON, and a second control part which receives the address strobe signal, and causes the address selector to select the output of the first address generation means when the address strobe signal is in the first state, and causes the address selector to select the output of the second address generation means when the address strobe signal is in the second state.

6. The microprocessor according to claim 5, wherein said second control part is constructed to be supplied the control signal output by said first control part, and comprises a delay means which delays and outputs the output of the second address generation means to the address selector when the second control part receives the control signal to enable the first storage means to store and the address strobe signal is in the second state.

7. The microprocessor according to claim 4, wherein the physical address generated by the first address generation means is a data address, and the physical address generated by the second address generation means is a bus address supplied via an external bus.

8. The microprocessor according to claim 4, wherein the physical address generated by the first address generation means is a data address, and the physical address generated by the second address generation means is an instruction address.

9. A microprocessor comprising:

first and second address generation means for generating physical addresses;

first and second address selectors which select an output of the first address generation means when an address strobe signal is in a first state, and select an output of the second address generation means when the address strobe signal is in a second state;

first and second storage means which store outputs of the first and second address selectors;

a cache memory including (a) a dual port memory means for memorizing a tag address and data which can independently be accessed by means of second parts of the outputs of the first and second storage means, and (b) a first comparator which detects a match between a first part of an output from the first storage means and an output of the tag address of the dual port memory means accessed by a second part of the output of the first storage means, and (c) a second comparator which detects a match between a first part of an output from the second storage means and an output of the tag address of the dual port memory means accessed by a second part of the output of the second storage means; and a control means for outputting a control signal for accessing said cache memory by alternately enabling said first and second storage means.

10. The microprocessor according to claim 9, wherein the physical address generated by the first address generation means is a data address, and the physical address generated by the second address generation means is a bus address supplied via an external bus.

11. The microprocessor according to claim 9, wherein the physical address generated by the first address generation means is a data address, and the physical address generated by the second address generation means is an instruction address.

12. A microprocessor according to claim 9, wherein the physical address generated by the first address generations means is a data address, and the physical address generated by the second address generation means is a branch address.

* * * * *